US006188151B1

(12) United States Patent
Livshits et al.

(10) Patent No.: US 6,188,151 B1
(45) Date of Patent: Feb. 13, 2001

(54) MAGNET ASSEMBLY WITH RECIPROCATING CORE MEMBER AND ASSOCIATED METHOD OF OPERATION

(75) Inventors: David Livshits, Ashdod; Alexander Mostovoy, Ashqelon; Georgy Kataev, Yaffo; Victor Shliakheckiy, Ashqelon, all of (IL)

(73) Assignee: Robotech, Inc., Brooklyn, NY (US)

( * ) Notice: Under 35 U.S.C. 154(b), the term of this patent shall be extended for 0 days.

(21) Appl. No.: 09/226,747

(22) Filed: Jan. 6, 1999

Related U.S. Application Data

(60) Provisional application No. 60/070,807, filed on Jan. 8, 1998.

(51) Int. Cl.$^{7}$ .......... H02K 33/02

(52) U.S. Cl. .......... 310/30; 335/281

(58) Field of Search .......... 310/12, 15, 17, 310/23, 30; 335/251, 255, 281

(56) References Cited

U.S. PATENT DOCUMENTS

| | | | |
|---|---|---|---|
| 2,480,057 | 8/1949 | Soreng et al. | 335/245 |
| 2,595,755 | 5/1952 | Bedford | 335/255 |
| 3,196,322 | 7/1965 | Harper | 335/251 |
| 4,217,507 * | 8/1980 | Jaffe et al. | 310/12 |
| 5,192,936 | 3/1993 | Neff et al. | 335/281 |
| 5,523,684 | 6/1996 | Zimmerman | 324/207.22 |

FOREIGN PATENT DOCUMENTS

| | | |
|---|---|---|
| 1489 975 | 6/1969 | (DE) . |
| 1764 986 | 1/1972 | (DE) . |
| 32 09 355 A1 | 9/1983 | (DE) . |
| 34 25 574 | 1/1985 | (DE) . |
| 37 20 347 | 1/1988 | (DE) . |
| 0644 561 A1 | 3/1995 | (EP) . |
| 1170474 | 1/1959 | (FR) . |
| 2 430 827 | 2/1980 | (FR) . |
| 2 743 933 | 7/1997 | (FR) . |

OTHER PUBLICATIONS

Patent Abstracts of Japan, vol. 008, No. 197 (M–324), Sep. 11, 1984, JP 59 086822 A, May 19, 1984—abstract.

* cited by examiner

*Primary Examiner*—Nestor Ramirez
*Assistant Examiner*—Judson H. Jones
(74) *Attorney, Agent, or Firm*—R. Neil Sudol; Henry D. Coleman; William J. Sapone

(57) ABSTRACT

An electromagnetic assembly includes a casing, a solenoid disposed inside the casing, a stationary magnetic core, and a movable magnetic core. The stationary magnetic core is disposed at least partially inside the solenoid and is fixed relative to the solenoid and the casing, while the movable magnetic core is disposed for reciprocation partially inside the solenoid along an axis. The stationary magnetic core, the movable magnetic core, the solenoid, and the casing have rectangular or square cross-sections in planes oriented essentially perpendicularly to the axis.

61 Claims, 16 Drawing Sheets

MAGNET ASSEMBLY WITH RECIPROCATING CORE MEMBER AND ASSOCIATED METHOD OF OPERATION

CROSS-REFERENCE TO A RELATED APPLICATION

This application relies for priority purposes on U.S. provisional application Ser. No. 60/070,807 filed Jan. 8, 1998.

BACKGROUND OF THE INVENTION

The present invention relates to magnet assemblies, particularly to electromagnetic assemblies with reciprocating core members. These electromagnetic devices are particularly useful as motors to perform work on loads. This invention also relates to an associated method for operating an electrical motor or an electromagnetic assembly with a reciprocating member.

Well known techniques for transforming electrical energy into other forms of energy such as mechanical movement utilize a solenoid enclosed in an outer shell or casing made of a material with a predetermined magnetic permeability. Inside the solenoid, there are disposed a stationary magnetic core and a movable magnetic core, both made of a material of known magnetic permeability. The solenoid is connected to a power supply to create a magnetic field which exerts a force on the movable magnet to move it. This moving magnetic core element is connected to a load so as to perform mechanical work on the load, whereby the electrical energy supplied to the solenoid is transformed into mechanical energy. The system is disconnected from the power supply followed by a recuperation of a portion of the energy that was used for magnetizing.

All known methods of transforming electrical energy to mechanical energy pursuant to the above technique are disadvantaged by low energy efficiency, significant heat losses, large physical dimensions, including mass, weight, and volume, low power output characteristics and low-speed reciprocating motion of the movable member.

SUMMARY OF THE INVENTION

An object of the present invention is to provide an electromagnet assembly.

Another object of the present invention is to provide an electromagnet assembly which is sable as a motor, for example, of the reciprocating type.

A more particular object of the present invention is to provide such an electromagnet assembly and motor which exhibits enhanced efficiency and economy.

It is a further object of the present invention to provide an electromagnetic or electric motor in which the specific mass, the specific volume and the linear dimensions of an electrical or electromagnetic motor assembly may be reduced, not only overall but also per unit of output energy.

A magnetic assembly in accordance with the present invention comprises a casing, a solenoid disposed inside the casing, a stationary magnetic core, and a movable magnetic core. The stationary magnetic core is disposed at least partially inside the solenoid and is fixed relative to the solenoid and the casing, while the movable magnetic core is disposed for reciprocation partially inside the solenoid along an axis. The stationary magnetic core and the movable magnetic core have polygonal cross-sections in planes oriented essentially perpendicularly to the axis.

The stationary magnetic core and the movable magnetic core are made of magneto-susceptible material, as is the casing. The stationary magnetic core and the movable magnetic core are shaped to fit tightly in the solenoid, while the casing has the same shape as the outside of the solenoid. It is generally contemplated that the solenoid and the casing have the same polygonal shape as the stationary magnetic core and the movable magnetic core. This polygonal shape is preferably rectangular or, more particularly, square. However other polygons such as triangles and pentagons may also be effective in providing an electromagnetic assembly which exhibits augmented efficiency when incorporated in a motor or engine design.

The polygonal shape of the magnet assembly results in a concentration of magnetic flux or magnetic field intensity at comers, where the flux changes direction, resulting in magnetic eddy effects.

The stationary magnetic core is fixed to the casing or shell, while the movable magnetic core is free to reciprocate with a varying portion of the movable magnetic core being located outside of the solenoid and the casing. The free end of the movable magnetic core may be connected to a load for purpose of doing work on the load. Alternatively, the enclosed end of the movable magnetic core, i.e., that end located inside the solenoid, may be connected to a load via a rod extending through a bore or through hole in the stationary magnetic core. The load advantageously works on the movable magnetic core to return the movable magnetic core to a fully extended or withdrawn position at the end of each cycle of operation.

In this motor, the electromagnet assembly with its stationary magnetic core and its movable magnetic core operates to change one form of energy, at least electrical energy, to mechanical energy. The linear reciprocation of the movable magnetic core may be converted to another type of motion, for example, rotary, by the nature of the load.

It is generally contemplated that the movable magnetic core has an inner end always disposed inside the solenoid and the casing, while an outer end of the movable magnetic core is always located outside the solenoid and the casing. Accordingly, reciprocation of the movable magnetic core will result in a continuously changing inductance of the electromagnetic reciprocating device (solenoid, casing and cores).

In accordance with another feature of the present invention, the solenoid is connected to an electrical power source which is operative to supply to the solenoid an electrical potential in the form of a series of transient electrical pulses having a phase synchronized with a reciprocating stroke of the movable magnetic core. The electrical pulses are transmitted from the power source to the solenoid during a power stroke of the movable magnetic core, i.e., during motion of the movable magnetic core from a maximally extended position to a maximally retracted position. In the maximally extended position, the movable magnetic core has a maximum proportion of its length located outside the solenoid and the casing, whereas in the maximally retracted position, the movable magnetic core has a minimum proportion of its length located outside the solenoid and the casing.

In one preferred mode of operation of the electromagnetic assembly, the energizing pulses fed from the power source to the solenoid have a sawtooth profile to maximize magnetization for a given average current value. This kind of current or power supply permits a maximization of magnetization at the average value of the current (which is about half of the maximum current value.) In another preferred mode of operation, the pulses have a width or duration which is pulse width modulated according to an instantaneous inductance of the device. The pulse width is controlled to regulate the speed of magnetization of the magnetic conductors (the stationary magnetic core, the movable magnetic core, and the casing). In general, it is preferred to reduce the speed of magnetization. In that case, the pulse width is controlled to decrease with increasing inductance of the device. It is to be noted, however, that the speed of magnetization of the magnetic conductors naturally decreases as the inductance of the device increases during a power stroke of the movable magnetic core, owing to a continually increasing volume of magnetic material located within the solenoid during the power stroke.

The inductance of an electromagnetic system, including the reciprocating magnet assembly and an electrical power supply circuit, may be additionally controlled via an external inductor having a variable inductance. This external inductor is placed in series with the solenoid for stabilizing the magnetization speed of the casing and concomitantly decreasing the growth rate (rate of increase) of the current. The external inductor is controlled to increase the system's inductive resistance, while maintaining a low active resistance, thereby permitting an acceleration of the electromagnetic saturation, a reduction in power consumption, an augmentation of the thrust of the mobile core, and a reduction in heat loss.

In accordance with a further feature of the present invention, the electrical power supply circuit includes means for periodically disconnecting the power supply from the solenoid during reciprocating of the movable magnetic core, thereby permitting energy recuperation in magnetic material of at least one of the casing, the stationary magnetic core and the movable magnetic core.

According to specific dimensional features of the present invention, the movable magnetic core has a length greater than one-half of the casing length, the solenoid has a wall thickness of less than approximately 9 mm, an outer surface of the movable magnetic core is spaced from the inner surface of the casing by a distance of less than approximately 10 mm, and the wall thickness of the solenoid differs from the distance between outer surface of the movable magnetic core and the inner surface of the casing by less than 1 mm. In addition, the stationary magnetic core is spaced from a transverse symmetry plane of the casing by a distance of approximately one quarter of the solenoid length less 1 to 4 mm, while the stationary magnetic core has a core length, measured along the axis, which is approximately one quarter of the solenoid length.

It is contemplated that the casing has a symmetry plane oriented transversely to the axis and also has a mouth opening traversed by the movable magnetic core. The symmetry plane essentially bisects the solenoid. The movable magnetic core has a reciprocation stroke with an extreme position where the inner end is located on a side of the symmetry plane opposite the mouth opening. The inner end of the movable magnetic core is disposed at less than approximately 4 mm from the symmetry plane in the extreme position of the movable magnetic core.

It is preferable at least in some applications that the solenoid has a length which is greater than the length of the reciprocation stroke of the movable magnetic core, while the casing has a length equal to approximately a sum of the length of the solenoid and the length of the movable magnetic core's reciprocation stroke. Also, the portion of the stationary core disposed inside the solenoid has a length at least one-third of the length of the movable magnetic core's reciprocation stroke.

Preferably, the electrical power supply or current source is adapted to initiate an energization of said solenoid when said movable magnetic core is located at a maximum distance from said stationary magnetic core and to terminate the energization of said solenoid when said movable magnetic core approaches a minimum distance from said stationary magnetic core.

The means for restoring or returning the movable magnetic core to its maximally extended position may include a spring-loaded push rod extending along the axis through the stationary magnetic core. The push rod may have a cylindrical outer surface coated with a nickel layer and an outer copper layer. In that case, the layer of copper preferably has a thickness of 45 to 50 $\mu$m and the layer of nickel preferably has a thickness of 50 to 60 $\mu$m. Additionally, a mechanical component may be operatively connected to the push rod for restoring the push rod to a withdrawn position prior to a moving of the movable magnetic core along the axis from the maximally extended position to the maximally retracted position. Generally, the push rod, the stationary magnetic core and the movable magnetic core are all made of the same material.

In a specific design configuration of the magnetic assembly pursuant to the present invention, the stationary magnetic core is manufactured from a plurality of steel fins bonded to each other along planes extending generally perpendicularly to the axis of the device. The steel fins have outer surfaces vacuum plated with a layer of aluminum, a layer of zinc, and a layer of nickel. The stationary magnetic core has a bore or through hole traversed by the push rod, the through hole being lapped by the push rod in a manufacturing process. In this design configuration, the layer of aluminum preferably has a thickness of 4 to 5 $\mu$m, the layer of zinc preferably has a thickness of 2 to 3 $\mu$m, and the layer of nickel preferably has a thickness of 50 to 60 $\mu$m.

The solenoid may specifically include a coil holder or spool of hard polyurethane vacuum plated with a layer of aluminum, a layer of zinc, and a layer of nickel, the solenoid having a cavity surface lapped with the movable magnetic core in a manufacturing process. Again, the layer of aluminum has a thickness of 4 to 5 $\mu$m, the layer of zinc has a thickness of 2 to 3 $\mu$m, and the layer of nickel has a thickness of 50 to 60 $\mu$m. Similarly, where the casing is constructed of a plurality of steel fins bonded to each other and having outer surfaces vacuum plated with a layer of aluminum, a layer of zinc, and a layer of nickel, the layer of aluminum has a thickness of 4 to 5 $\mu$m, the layer of zinc has a thickness of 2 to 3 $\mu$m, and the layer of nickel has a thickness of 50 to 60 $\mu$m.

Where the solenoid has a polygonal cross-section in planes oriented essentially perpendicularly to the axis, the spool defines a spool cavity having edges extending parallel to the axis. According to a particular feature of the present invention, those edges are provided with elongate oil channels extending parallel to the axis.

According to other features of the present invention, the solenoid and the casing are coaxially and symmetrically disposed about the axis, the axis is an axis of symmetry of the stationary magnetic core and the movable magnetic core and the solenoid is symmetrical about the axis, and the stationary magnetic core is integral with the casing. Where the solenoid includes a coil holder or spool having walls, the stationary magnetic core and the movable magnetic core having working surfaces, a space between the working surfaces and the walls is filled with grease.

An energy conversion method in accordance with the present invention utilizes a magnetic device including a casing, a solenoid disposed inside the casing, a stationary magnetic core disposed inside the solenoid, the stationary core being fixed relative to the solenoid and the casing, and a movable magnetic core disposed for reciprocation inside the solenoid along an axis. The method comprises reciprocating the movable magnetic core along the axis and between a maximally retracted position to a maximally extended position. In the maximally retracted position, the movable magnetic core has a maximum proportion of its length located inside the solenoid, while in the maximally extended position the movable magnetic core has a minimum proportion of its length located inside the solenoid. During reciprocating of the movable magnetic core, the solenoid is supplied with an electrical potential in the form of a series of transient electrical pulses having a phase synchronized with a reciprocating stroke of the movable magnetic core.

In accordance with another feature of the present invention, a force is applied to the movable magnetic core to return the movable magnetic core from the maximally retracted position to the maximally extended position. The movable magnetic core may be pushed with a push rod extending along the axis through the stationary magnetic core. Alternatively, the movable magnetic core may be pulled out of the solenoid by a linkage extending, for example, to a flywheel. Preferably, the push rod, the stationary magnetic core and the movable magnetic core are all made of the same material.

Pursuant to a more particular feature of the present invention, the push rod is restored or returned to a withdrawn position (withdrawn from the solenoid and the casing) prior to a moving of the movable magnetic core along the axis from the maximally extended position to the maximally retracted position. The restoring of the push rod precedes the moving of the movable magnetic core along the axis from the maximally extended position to the maximally retracted position by at least approximately 0.5 ms.

As discussed above, the pulses may have a sawtooth profile to maximize magnetization for a given average current value and/or a width or duration which is pulse width modulated according to an instantaneous inductance of the device.

Where an additional inductor with a variable inductance is provided in an electrical circuit including the solenoid, the method further comprises continually adjusting the inductance of the additional inductor during reciprocating of the movable magnetic core.

In accordance with yet another feature of the present invention, the supplying of the electrical potential includes generating the pulses in a power supply and conducting the pulses to the solenoid, and the method further comprises periodically disconnecting the power supply from the solenoid during reciprocating of the movable magnetic core, thereby permitting energy recuperation in magnetic material of at least one of the casing, the stationary magnetic core and the movable magnetic core.

An electromagnetic motor assembly in accordance with the present invention presents an efficiency which is improved over conventional electric motors. This efficiency is believed to arise in part because of the polygonal (e.g., square or cubic) configuration of the magnet parts and in part because of the mode of operation. The present invention is believed to enable an extraction of energy not only from an electrical power source but also from the environment, for example, by way of thermal energy. Thus, less power is required of the power source to perform the same amount of work on a load. In addition, with respect to the method of operation, electromagnetic energy introduced into the magnet assembly in order to perform work is partially returned to the electrical system from the magnet parts and to the magnetic domains of the magnet cores and the casing.

Because of increased efficiency provided by the present invention, it is feasible to reduce the specific mass, the specific volume and the linear dimensions of an electrical or electromagnetic motor assembly, not only overall but also per unit of output energy.

An electromagnet with a reciprocatable core in accordance with the present invention produces a greater driving force per unit weight, dimensions, and energy consumption than conventional electromagnets with reciprocating cores. The increase in driving force may be as much as 2 to 5 times.

An electromagnet with a reciprocatable core in accordance with the present invention produces a greater driving force per unit stroke of the movable magnetic core. When compared to conventional magnets, the increase in driving force is 1.5 to 2.5 times.

An electromagnet with a reciprocatable core in accordance with the present invention may be made out of ordinary (as opposed to special, electric) steel. New technologies can be used to manufacture the instant electromagnets. These technologies include liquid pressing of metal, cutting using an electric spark, stamping using devices with a computer chips.

Other advantages of an electromagnet with a reciprocatable core in accordance with the present invention are as follows. Due to high specific driving force, the magnet does not have to be operated at maximum capacity. This allows the magnet to last longer, to exhibit reduced heat losses, and to have improved reliability. The magnet can be operated at high speeds of 50 cycles per minute and faster. Different types of finishing treatments, which are not used in conventional magnet designs, can be applied to the present magnets. Such treatments include a combination of chemical and galvanic coating of metal and plastic, which yields a new type of the solenoid case. The solenoid serves in part as a guide for the movable magnetic core and as a lubricant accumulation compartment. What is the most important, these treatment allow a minimization of air gaps between the movable and the immovable parts of magnet.

An electromagnet with a reciprocatable core in accordance with the present invention exhibits enhanced efficiency by reducing specific energy consumption per unit pulling or driving force produced. There is an improvement in speed over conventional reciprocating type magnets. There is a shortening complete cycle of the magnet's operation.

DESCRIPTION OF THE PREFERRED EMBODIMENTS

Figure 1:
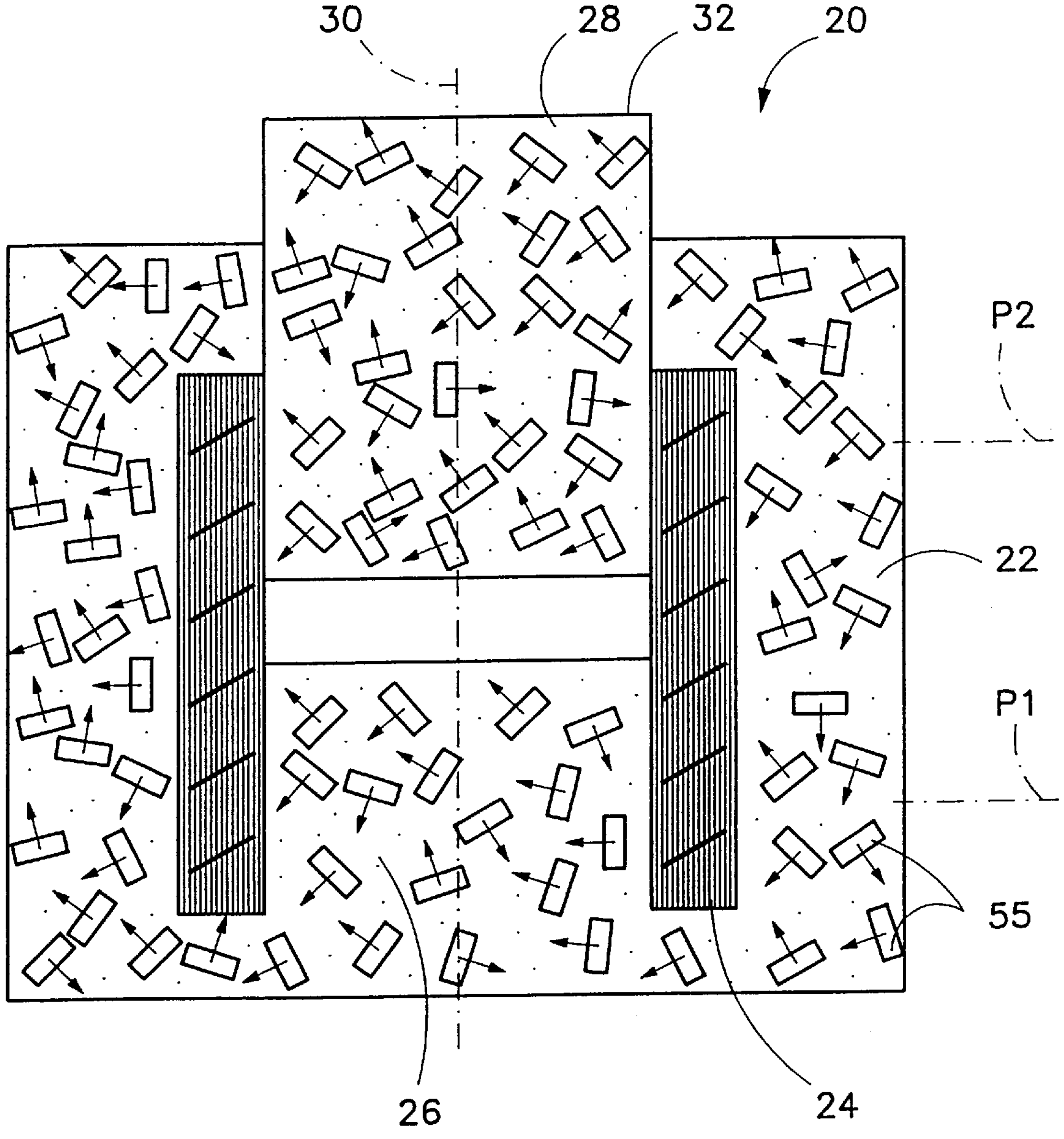
FIG. 1 is a schematic axial cross-sectional view of an electromagnetic assembly with a reciprocating magnetic core, in accordance with the present invention, showing randomly oriented magnetic domains in magneto-susceptible material of the assembly.
Figure 2:
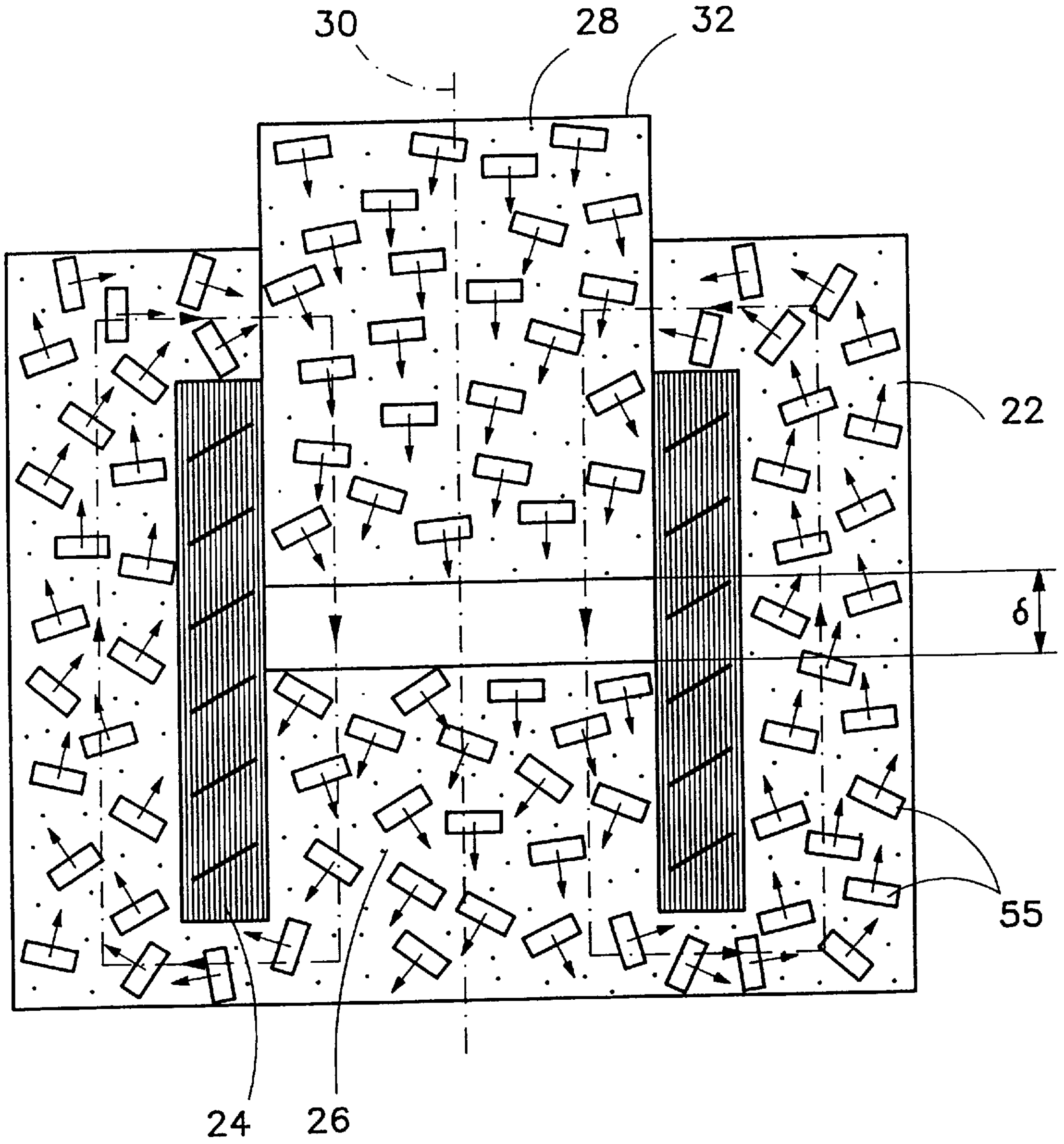
FIG. 2 is a schematic axial cross-sectional view similar to FIG. 1, showing parallel orientation among the magnetic domains owing to the imposition of a magnetic field.

As illustrated in FIGS. 1 and 2, an electromagnetic assembly 20 comprises a casing 22, a solenoid 24 disposed inside the casing, a stationary magnetic core 26 integral with the casing, and a movable magnetic core 28. Stationary magnetic core 26, movable magnetic core 28, and casing 22 are made of magneto-susceptible material. Stationary magnetic core 26 is disposed at least partially inside solenoid 24 and is fixed relative to the solenoid and casing 22, while movable magnetic core 28 is disposed for reciprocation partially inside the solenoid along an axis 30. Stationary magnetic core 26 and movable magnetic core 28 have polygonal cross-sections in planes P1, P2 oriented essentially perpendicularly to axis 30. In the embodiment of FIGS. 1 and 2, cores 26 and 28 particularly have a rectangular or square cross-section in planes P1, P2. Solenoid 24 and casing 22 have the same polygonal or, more specifically, rectangular, shape as stationary magnetic core 26 and movable magnetic core 28. Stationary magnetic core 26 and movable magnetic core 28 are shaped to fit tightly in solenoid 24, while casing 22 has the same shape as the outside profile of solenoid 24.

Figure 3:
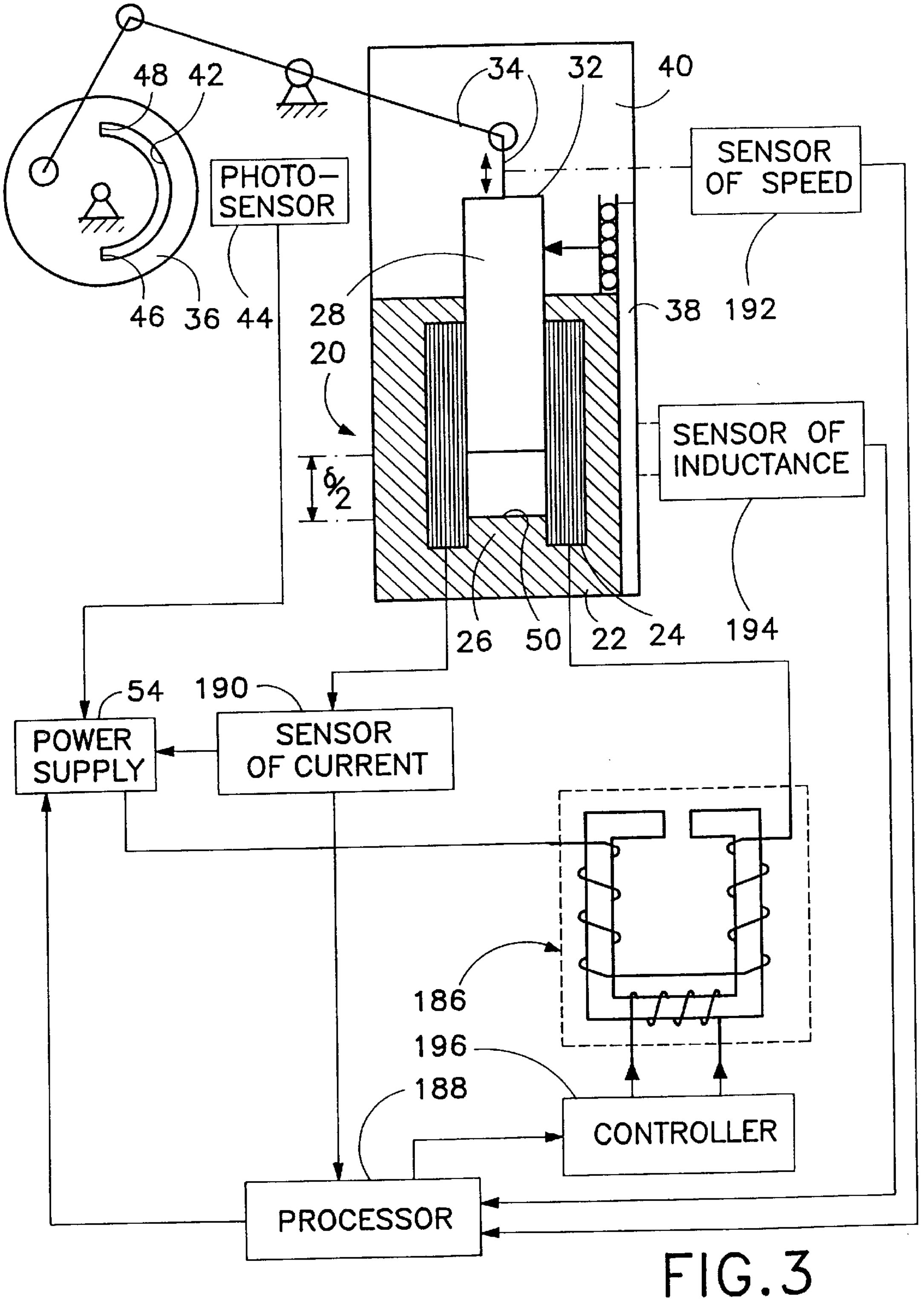
FIG. 3 is a diagram of the electromagnetic assembly of FIGS. 1 and 2, together with a flywheel assembly, showing use of the electromagnetic assembly as part of a motor or engine.

Movable magnetic core 28 is free to reciprocate with a varying proportion of the movable core being located outside of solenoid 24 and casing 22. As illustrated in FIG. 3, a free end 32 of movable magnetic core 28 may be connected via interlinked crank rods 34 to a load 36 such as a flywheel for purpose of doing work on the load. Electromagnetic assembly 20 is mounted via a bracket or mounting arm 38 to a base 40. Flywheel 36 is provided with an arcuate slot 42 for purposes of providing a timing signal. To that end, a photosensor 44 is disposed proximate to the circular edge of flywheel 36 for detecting the passage of transverse edges 46 and 48 of slot 42.

In electromagnetic assembly 20, electrical energy is transformed into mechanical energy all within a space enclosed by casing 22. Casing 22 serves in part at least to reduce losses of electromagnetic field energy. In the engine of FIG. 3, the poles of the stator (casing 22 and stationary magnetic core 26) and the rotor (movable magnetic core 28) interact perpendicularly to the opposing surfaces 50 and 52 of stationary magnetic core 26 and movable magnetic core 28. This mode of interaction, in contrast to conventional engines where the pole interaction occurs at a different angle, is believed to increase the energy-transformation performance efficiency of the engine.

When movable magnetic core 28 is located at a maximum distance 8 from stationary magnetic core 26, i.e., when opposing surfaces 50 and 52 are separated to a maximum extent, an electrical current is conducted through solenoid 24. At this moment, edge 46 of slot 42 is juxtaposed to photosensor 44. An output signal from photosensor 44 initiates the transmission of the electrical current through solenoid 24. Preferably, the current grows rapidly to achieve a predetermined value in a shortest possible time. Magnetic forces generated by the current flow through solenoid 24 cause movable magnetic core 28 to be drawn into the solenoid. Movable magnetic core 28 thus executes a power stroke which starts from the maximally extended position in which the movable magnetic core is located at the maximum distance δ from stationary magnetic core 26. The motion of core 28 exerts a turning force on flywheel 36 via crank rods 34. When the distance between movable magnetic core 28 and stationary magnetic core 26 reaches a minimum, for example, 0.5 to 1 mm, the supply of electrical current to solenoid 24 ceases. At this juncture, edge 48 of slot 42 is located adjacent to photosensor 44, with the result that the photosensor 44 produces an output signal, or a change in its output signal, which terminates the transmission of the electrical current to and through solenoid 24. At that point, at the maximally retracted position of movable magnetic core 28, residual current in solenoid 24 is directed back to a power supply 54, while the inertial rotation of flywheel 36 carries the movable magnetic core back towards the maximally extended position at a distance o from stationary magnetic core 26.

As illustrated in FIG. 1, the material of magnetic cores 26 and 28 and casing 22 has magnetic domains 55 wherein the magnetic momenta of the iron atoms are parallel to each other and accordingly add up. The domains 55 can thus be considered to be mini-magnets. It is known that the material of magnetic conductors consists almost entirely of such domains. Conducting electrical current through solenoid 24 results in a magnetic field which tends to align all of the magnetic domains 55 in the same direction, as illustrated in FIG. 2. Upon termination of electrical current flow through solenoid 24, the magnetic domains 55 will remain oriented for some time in the induced direction shown in FIG. 2. It is to be noted that the magnetic flux generated by the aligned domains 55 is several orders of magnitude greater than the flux generated by solenoid 24. This enables substantial mechanical work to be performed by movable magnetic core 28.

In an experiment conducted on the engine of FIG. 3, the length of the reciprocation stroke of movable magnetic core 28 was 5 mm, the nominal current J was 10 A, the solenoid resistance was 1.4Ω, the average thrust was 1000 N, the inductance when the core gap was zero was 0.11 Henry, the maximum rotation frequency of flywheel 36 was 40 Hz, the radius of crank rods 34 was 25 mm, the lever arm ratio was 1.5, the loop number of solenoid 24 was 200 and the magnet weight was 2.5 kg.

Calculations using well known formulas predict the expected power consumption to be approximately 200 W. However, the experimental measurements of the engine model of FIG. 3 during operations showed that the power supply consumption did not exceed 130 to 145 W. This power consumption indicates a significant improvement in efficiency over conventional electromechanical engines.

Figure 4:
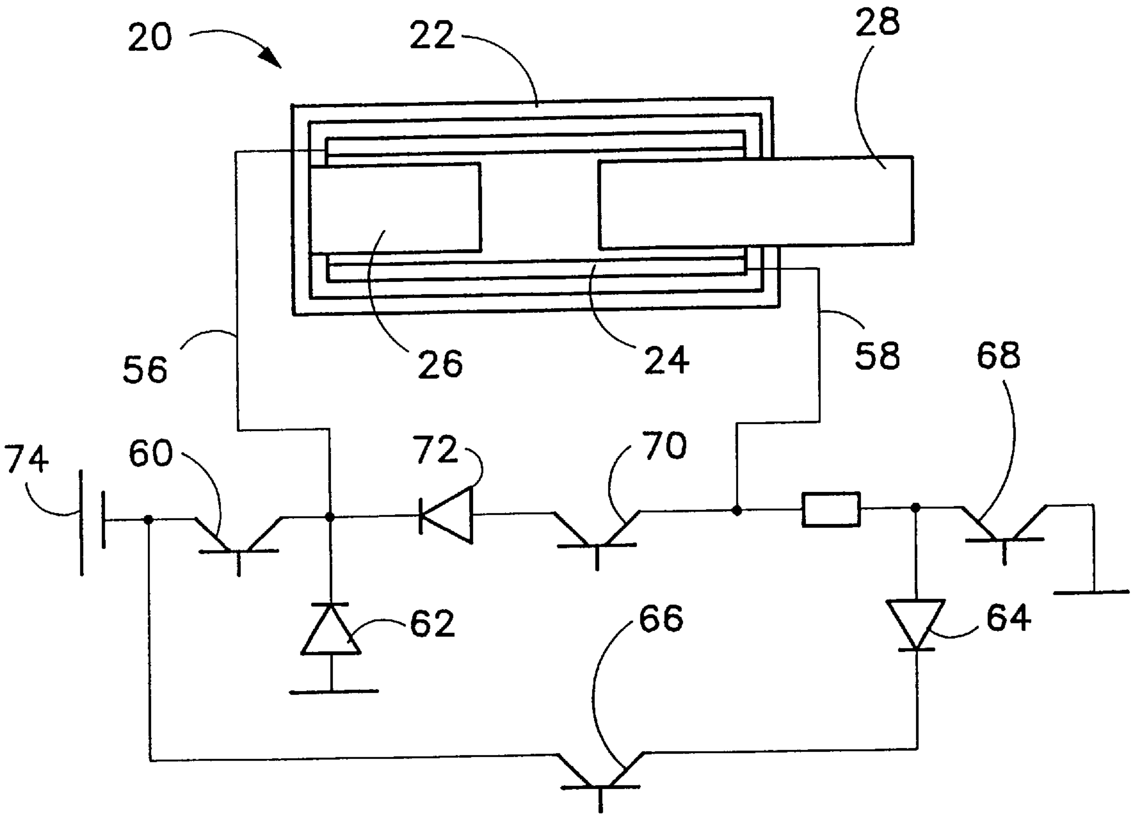
FIG. 4 is partially a schematic axial cross-sectional view of the electromagnetic assembly of FIGS. 1 and 2 and partially a circuit diagram of a power supply shown in FIG. 3, in accordance with the present invention.

As illustrated in FIG. 4, solenoid 24 is connected to a positive pole of power supply 54 via a wire 56 and to a negative pole of the power supply via a wire 58. Power supply 54 includes a transistor switch 60, a diode 62 for allowing current flow only in the direction of the negative pole of the power supply, and another diode 64 for allowing current flow only in one direction through a voltage control transistor 66. Power supply 54 further includes transistors 68 and 70 and a diode 72.

At the maximally extended position of movable magnetic core 28, when the core is at distance δ plus 0.5–1 mm from stationary magnetic core 26, switch 60 is opened and current is applied to solenoid 24 in the form of a powerful pulse for generating a magnetic field of required intensity inside solenoid 24 in the shortest time possible. The state of the magnetic field is maintained by applying pulses of current to solenoid 24 throughout the power stroke of movable magnetic core 28. The series of transient electrical pulses have a phase synchronized with a reciprocating stroke of movable magnetic core 28. The energizing pulses from power supply 54 may have a sawtooth profile to maximize magnetization for a given average current value and/or a width or duration which is pulse width modulated according to an instantaneous inductance of the device.

When movable magnetic core 28 approaches stationary magnetic core 26, the energizing current is interrupted. Energy in the magnetic field is then converted into electric current with a set voltage. This current is directed back to a power source 74 included in power supply 54. Movable magnetic core 28 is returned from its maxinally retracted position to its maximally extended position by an external force exerted, for example, by flywheel 36. The cycle is then repeated at the highest possible frequency.

Cores 26 and 28 and casing 22 must be made of a magneto-susceptible material. Casing 22 is an external enclosure which functions to prevent energy leakage into the environment. Moreover, driving force is developed in the electromagnet assembly 20 not only from an interaction between stationary magnetic core 26 and movable magnetic core 28 but also between the cores and casing 22.

Casing 22 and cores 26 and 28 have parallel walls. The polygonal cross-section of casing 22 and cores 26 and 28 also contributes to the effectiveness or efficiency of the energy transformation.

Figure 5:
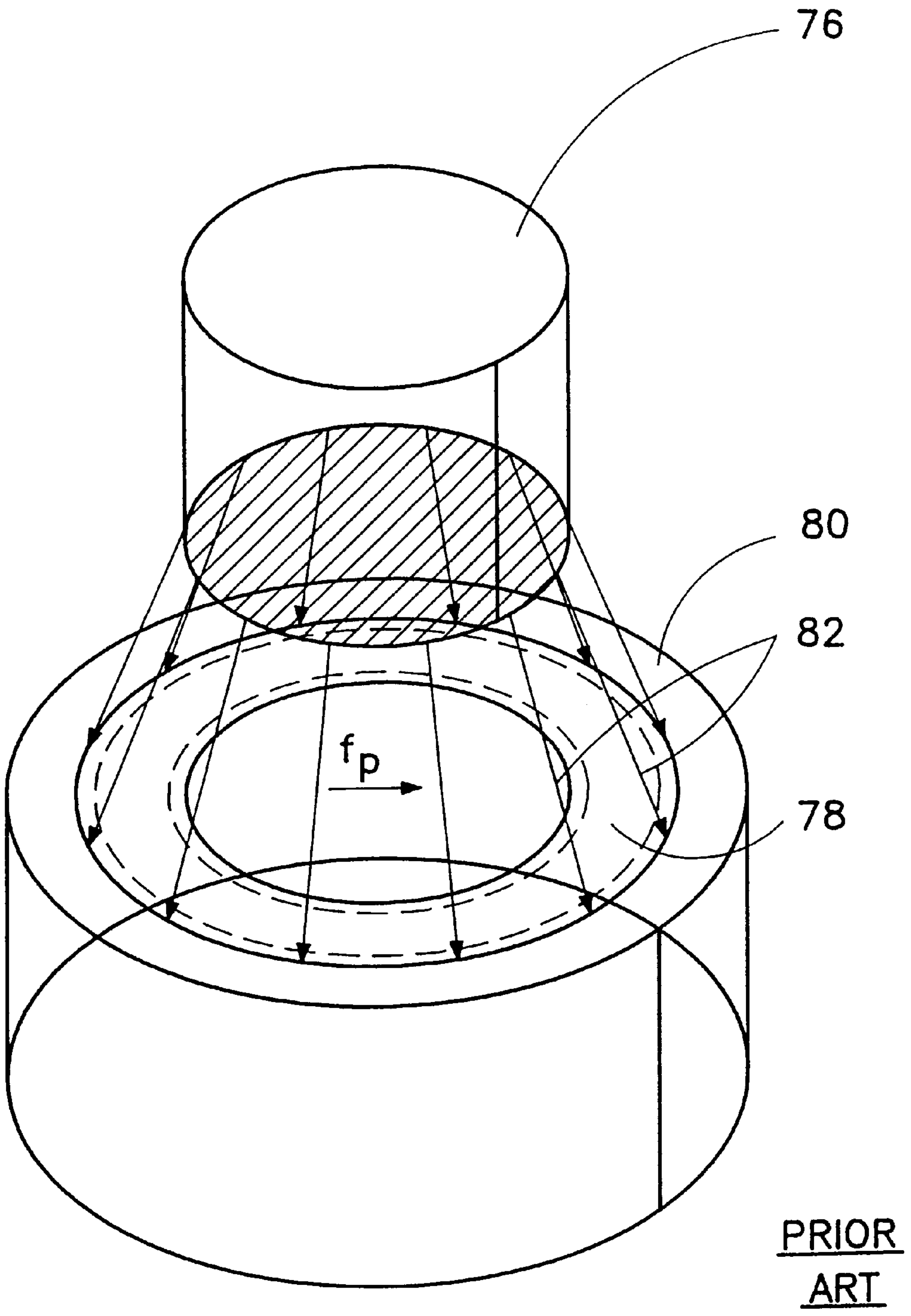
FIG. 5 is a partial schematic perspective view of a prior art reciprocating-type electromagnet, showing lines of force between a movable magnetic core and a stator.
Figure 6:
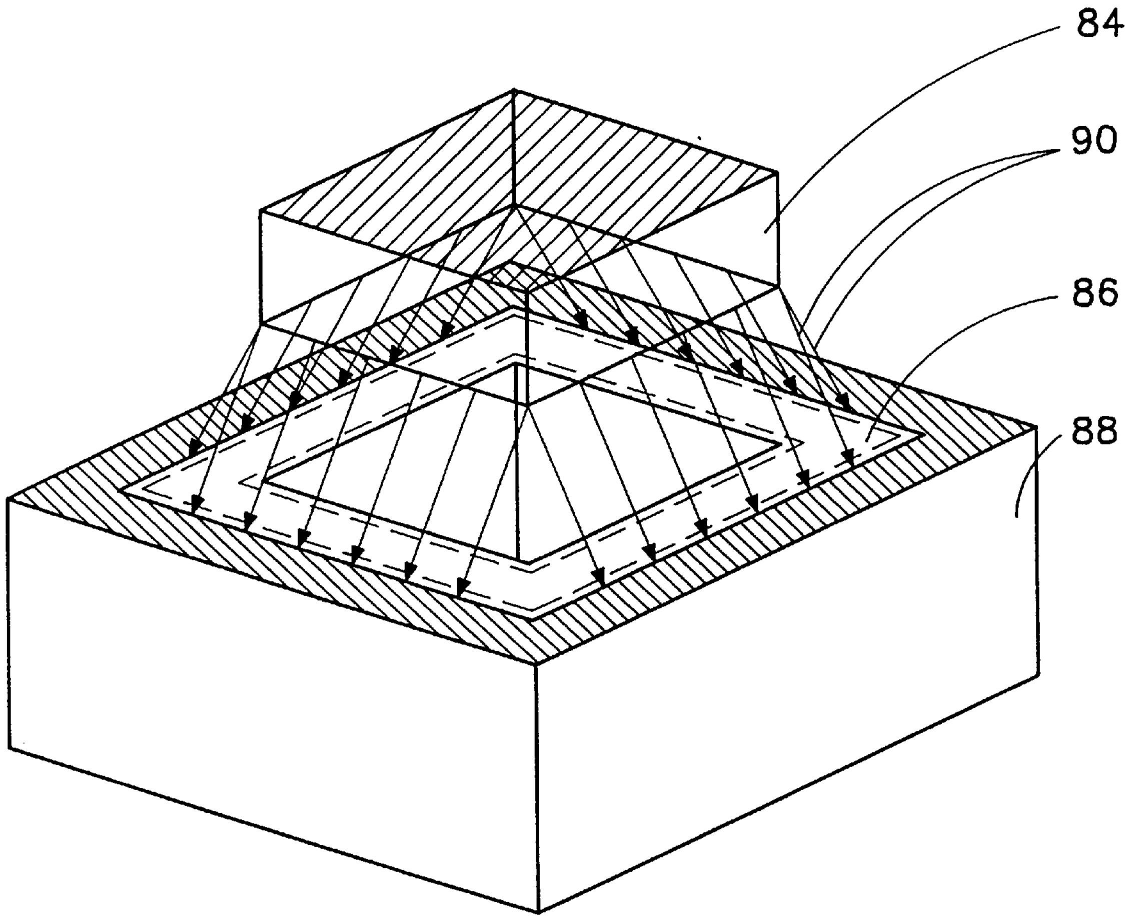
FIG. 6 is a partial schematic perspective view of the electromagnetic assembly of FIGS. 1 and 2, showing lines of force between a movable magnetic core and a stator.

The effectiveness of energy transformation in a polygonal magnet system as described herein and a conventional cylindrical magnet is clarified by comparing FIGS. 5 and 6. FIG. 5 illustrates a cylindrical assembly having a cylindrical movable magnetic core 76 (only a portion shown in the drawing) reciprocatable partially inside a solenoid 78 which is surrounded by a magneto-susceptible casing 80. FIG. 5 also shows interaction forces 82 between movable magnetic core 76 and casing 80. FIG. 6 similarly depicts a portion of a movable magnetic core 84 having the shape of a right rectangular prism disposed for reciprocation partially inside a solenoid 86 which is surrounded by a magneto-susceptible casing 88. Arrows 90 indicate interaction forces between movable magnetic core 84 and casing 88.

It is clear from FIGS. 5 and 6 that when the interaction forces are summed up, only parallel forces are added up on each side of the rectangular or square core 84, while the force vectors in the case of cylindrical core 76 spread out like an open sheaf and result in traverse forces $F_p$. It has been established experimentally that the net side force for the rectangular or square core 84 is 2.5 to 3.0 times greater than that for the cylindrical core 76. In addition, for iron and iron-based alloys, the rectangular shape requires the least energy for magnetization.

The mass of electromagnetic assembly 20 should not be less than a critical value of 8 to 10 kg. The greater the total mass of the electromagnetic assembly 20, the greater specific work done, i.e., the work per kilogram of the magnet's weight. This phenomenon can perhaps be explained by the fact that overall orderliness of the magnetic domain structure in wide magnetic conductors increases with increasing conductor width. This applies to reciprocating electromagnets with a long reciprocation stroke, i.e., where the stroke of the movable magnetic core has a length approximately equal to the length of the side of the cross-section of the movable core.

Figure 7:
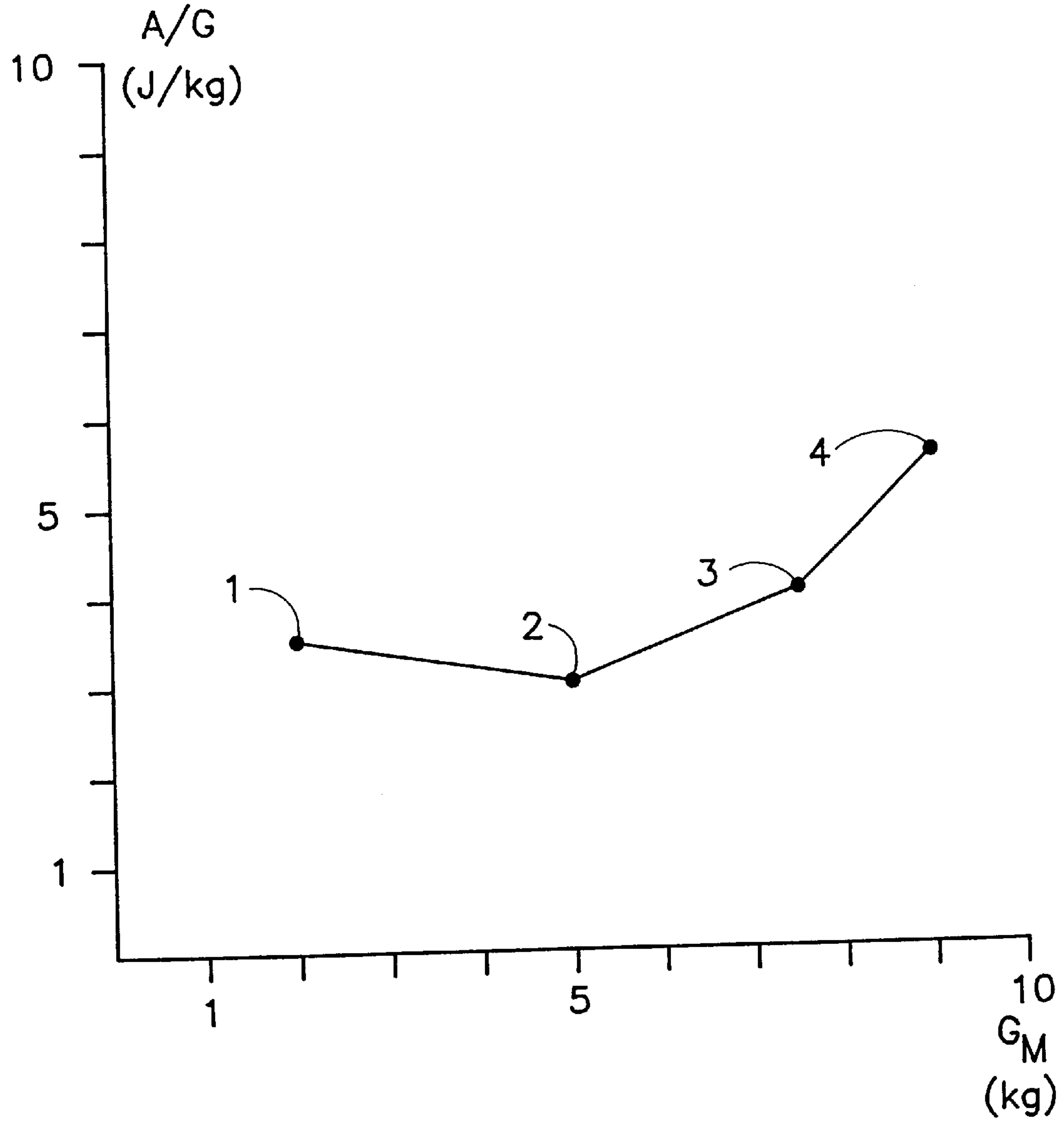
FIG. 7 is a graph showing energy output as a function of total mass of an electromagnetic assembly operated as a reciprocating machine under the control of an energizing circuit or power supply as shown in FIGS. 3 and 4.

FIG. 7 presents some experimental data and some calculated numbers showing the relationship between energy per unit mass (A/G) and total mass ($G_M$). Point 1 describes the situation when movable magnetic core 28 of electromagnetic assembly 20 has dimensions of 20 mm by 20 mm and a power stroke of 15 mm. Point 2 corresponds to the situation when movable magnetic core 28 has dimensions of 30 mm by 30 mm and a power stroke of 25 mm. For point 3, movable magnetic core 28 has dimensions of 40 mm by 40 mm and a power stroke of 25 mm. For point 4, movable magnetic core 28 has dimensions of 50 mm by 50 mm and a power stroke of 30 mm. Mass of the magnet in kilograms is plotted along the horizontal axis, while mechanical work in Joules/kilogram is plotted along the vertical axis.

As one can see from the graph of FIG. 7, any significant increase in the output of the material begins for masses over 8 to 10 kg, preferably over 10 kg. It is believed from experiments and theory that such a magnet can provide output in the motor of over 1 kW. This output provides for all of the energy needs of the motor.

Figure 8:
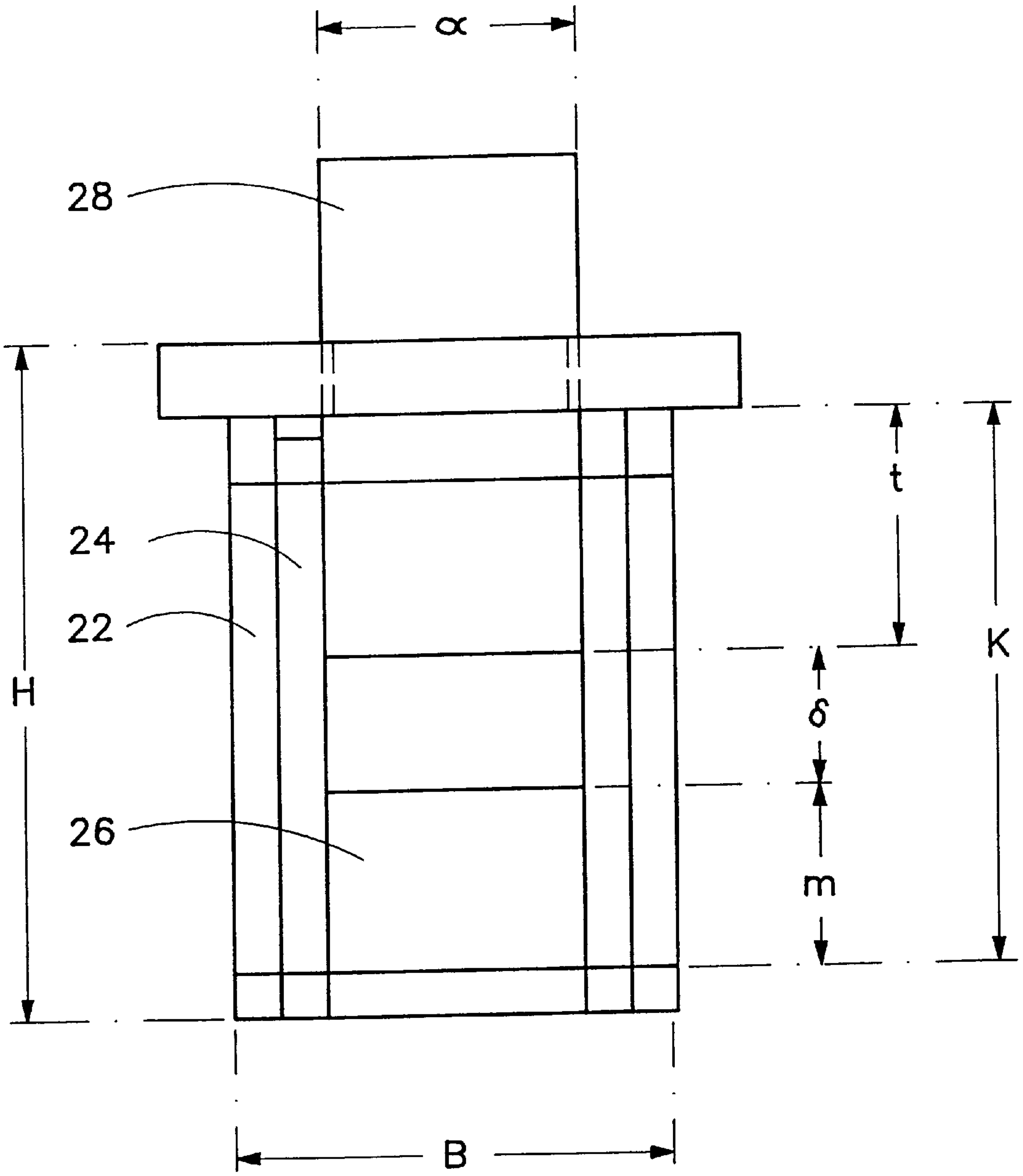
FIG. 8 is a schematic side elevational view of the electromagnetic assembly of FIGS. 1 and 2, indicating selected dimensions of the assembly.

Preferably, electromagnetic assembly 20, including cores 26 and 28, casing 22 and solenoid 24, has a shape of a straight parallelpiped with the short edges parallel to each other. Preferred mathematical relationships among various dimensions of electromagnetic assembly 20 (see FIG. 8) are set forth in the following equations where a represents the width of movable magnetic core 28, K represents the length of solenoid 24, m represents the height of stationary magnetic core 26, t represents the length of that portion of movable magnetic core 28 which is disposed inside casing 22 when the movable magnetic core is at its maximally extended position, δ is the maximum distance between movable magnetic core 28 and stationary magnetic core 26, H is the height of the entire electromagnet assembly 20, and B is the width of the entire electromagnet assembly 20.

1) $K=2.1 \cdot \underline{a}$

2) $\underline{m}=0.3 \cdot K$

3) $\underline{t}=0.4 \cdot K$

4) $\delta=0.3 \cdot K$

5) $H=1.2 \cdot K$

6) $B=0.75 \cdot H$

7) $\underline{m}+\underline{t}+\delta=K$

The preferred mathematical relationships set forth above were derived from experiments on a prototype magnet assembly where certain dimensions were adjustable, including the height m of stationary magnetic core 26 and the length t of that portion of movable magnetic core 28 which is disposed inside casing 22 when the movable magnetic core is at its maximally extended position.

Experiments have shown that one cubic centimeter of iron in one full cycle of reciprocation of movable magnetic core 28 with a power stroke of 30 mm can release approximately 0.5 to 1.0 Joule of energy in mechanical form. Thus, depending on the initial requirements, the volume V of stationary magnetic core 26 can be calculated as follows:

8) $V=N/(\underline{f} \cdot \Delta E)$ where f is the frequency of magnet activation and the frequency of approach of movable magnetic core 28 to stationary magnetic core 26, ΔE is the specific energy capacity (0.5 J) of the material of the cores 26 and 28, and N is the required power of the electromagnet assembly 20. Once the volume V of the stationary magnetic core 26 is calculated, the other parameters of the electromagnet assembly 20 can be calculated according to equations 1) through 6) above, provided that the edge a of movable magnetic core 28 is known.

Experiments have demonstrated further that the work performed by the electromagnet assembly 20 should be no less that 50 J per cycle.

Other preferable physical dimensions of electromagnetic assembly 20 will now be discussed with reference to FIG. 9. Movable magnetic core 28 has a length $L_6$ greater than one-half of the length or height H of casing 22, while solenoid 24 has a wall thickness $L_2$ of less than approximately 9 mm. An outer surface 92 of movable magnetic core 28 is spaced from an inner surface 94 of casing 22 by a distance $L_2$, of less than approximately 10 mm. Solenoid 24 has a wall thickness $L_1$ differing from the distance $L_2$ between outer surface 92 of movable magnetic core 28 and inner surface 94 of casing 22 by less than 1 mm. In addition, stationary magnetic core 26 is spaced from a transverse symmetry plane P3 of casing 22 by a distance $L_3$ of approximately one quarter of the length K of solenoid 24 less 1 to 4 mm, while length or height m of stationary magnetic core 26, as measured along axis 30, is approximately one quarter of the length K of solenoid 24.

It is contemplated that symmetry plane P3 is oriented transversely to axis 30 and that solenoid 24 has a mouth opening 96 traversed by movable magnetic core 28. Symmetry plane P3 essentially bisects solenoid 24. Movable magnetic core 28 has a reciprocation stroke with a maximally retracted position where an inner end face 98 of the movable magnetic core 28 is located on a side of symmetry plane P3 opposite mouth opening 96. Inner end face 98 of movable magnetic core 28 is disposed at a distance $L_7$ of less than approximately 4 mm from symmetry plane P3 in the maximally retracted position of movable magnetic core 28.

It is preferable at least in some applications that the length K of solenoid 24 is greater than the length (δ-[0.5 to 1 mm]) of the reciprocation stroke of movable magnetic core 28, while length or height H of casing 22 is approximately equal to a sum of the length K of solenoid 24 and the length (δ-[0.5 to 1 mm]) of the reciprocation stroke of movable magnetic core 28. Also, the portion of stationary core 26 disposed inside solenoid 24 has a length m at least one-third of the length (δ-[0.5 to 1 mm]) of the reciprocation stroke of movable magnetic core 28.

Figure 9:
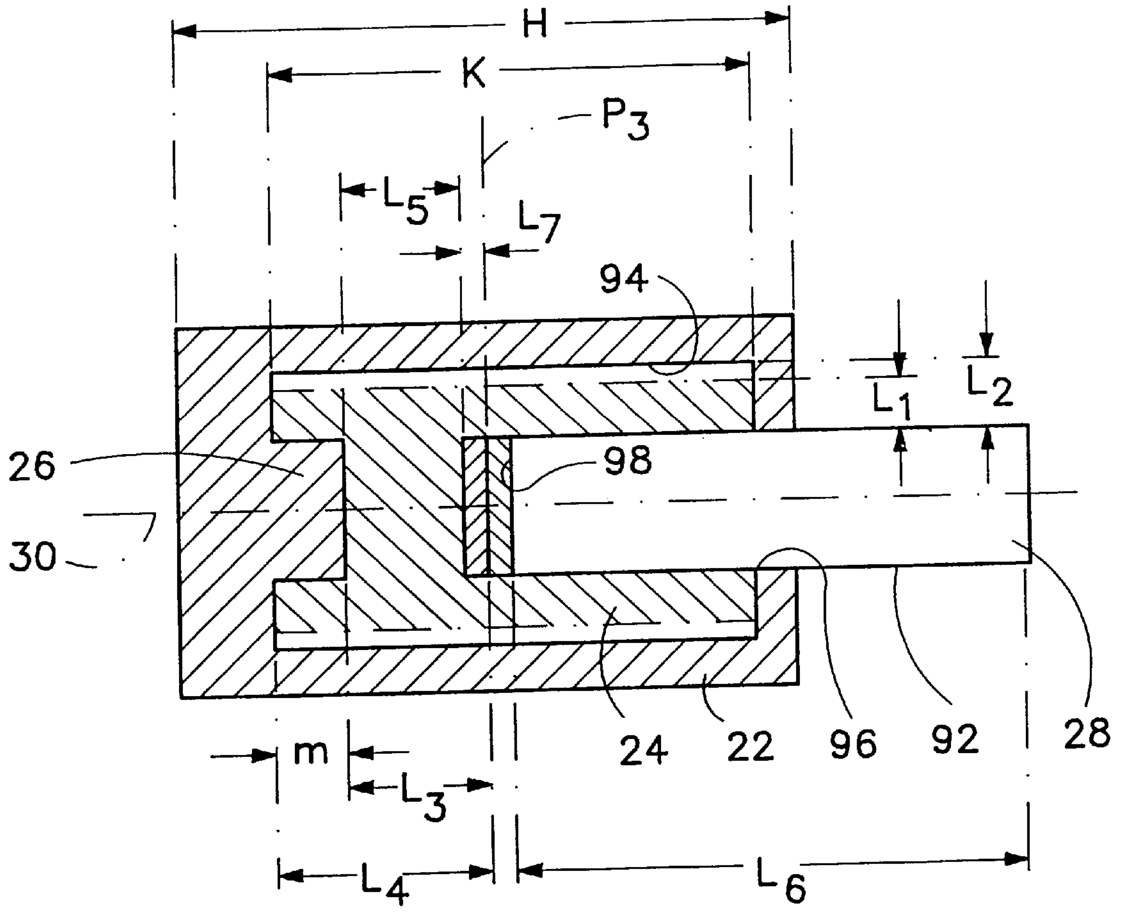
FIG. 9 is a schematic axial cross-sectional view of the electromagnetic assembly of FIGS. 1, 2 and 8, indicating additional dimensions of the assembly.

In FIG. 9, distance $L_4$ is equal to length m of stationary magnetic core 26 plus the distance $L_3$ between stationary magnetic core 26 and symmetry plane P3. $L_5$ represents the distance between stationary magnetic core 26 and the maximally retracted position of inner end face 98 of movable magnetic core 28.

The relationships among the principal dimensions of electromagnetic assembly 20 are summarized by the following equations:

9) $K/2=L_4$

10) $L_4/2=L_3$

11) $L_2=L_1+1$ (mm)

12) $L_7=1$ to 4 mm

13) $L_5=K/4-(1$ to 4 mm)

14) $L_5+L_7=K/4$

15) $L_4-(L_5+L_7)=K/4$

16) $L_3-L_7=L_5$

17) $L_4-L_3<K/4$

18) $(L_4-L_3)\pm 0.2 =K/4$

19) Stroke of movable magnet core=(¼−$L_7$) mm.

Figure 10:
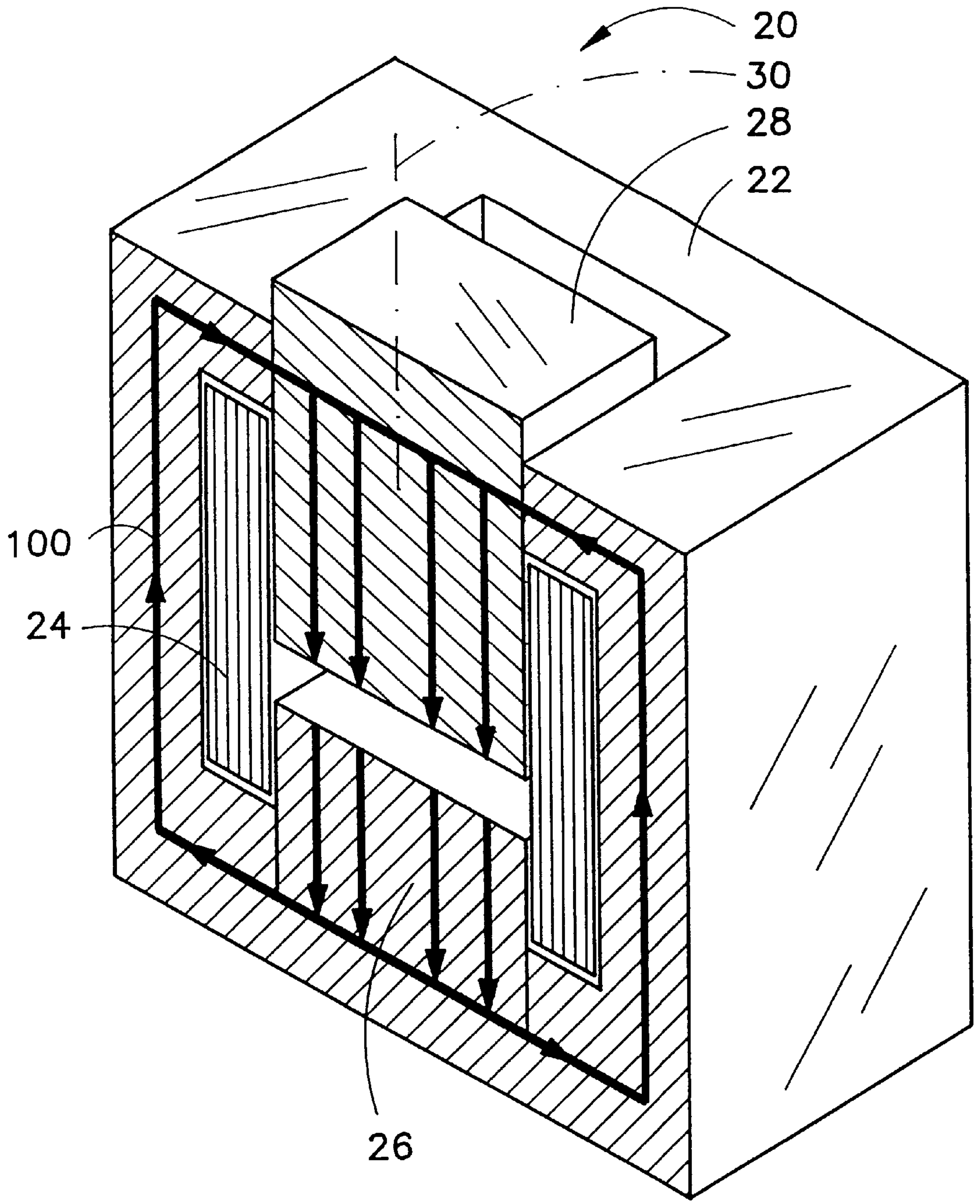
FIG. 10 is a schematic isometric view, partly broken away along an axial plane, of the electromagnetic assembly of FIGS. 1 and 2, showing lines of a magnetic field generated in the assembly during operation.

FIG. 10 is a longitudinal cross-sectional view of electromagnet assembly 20, taken in a plane including axis 30. Arrows 100 indicate magnetic field lines generated during energization of solenoid 24.

Figure 11:
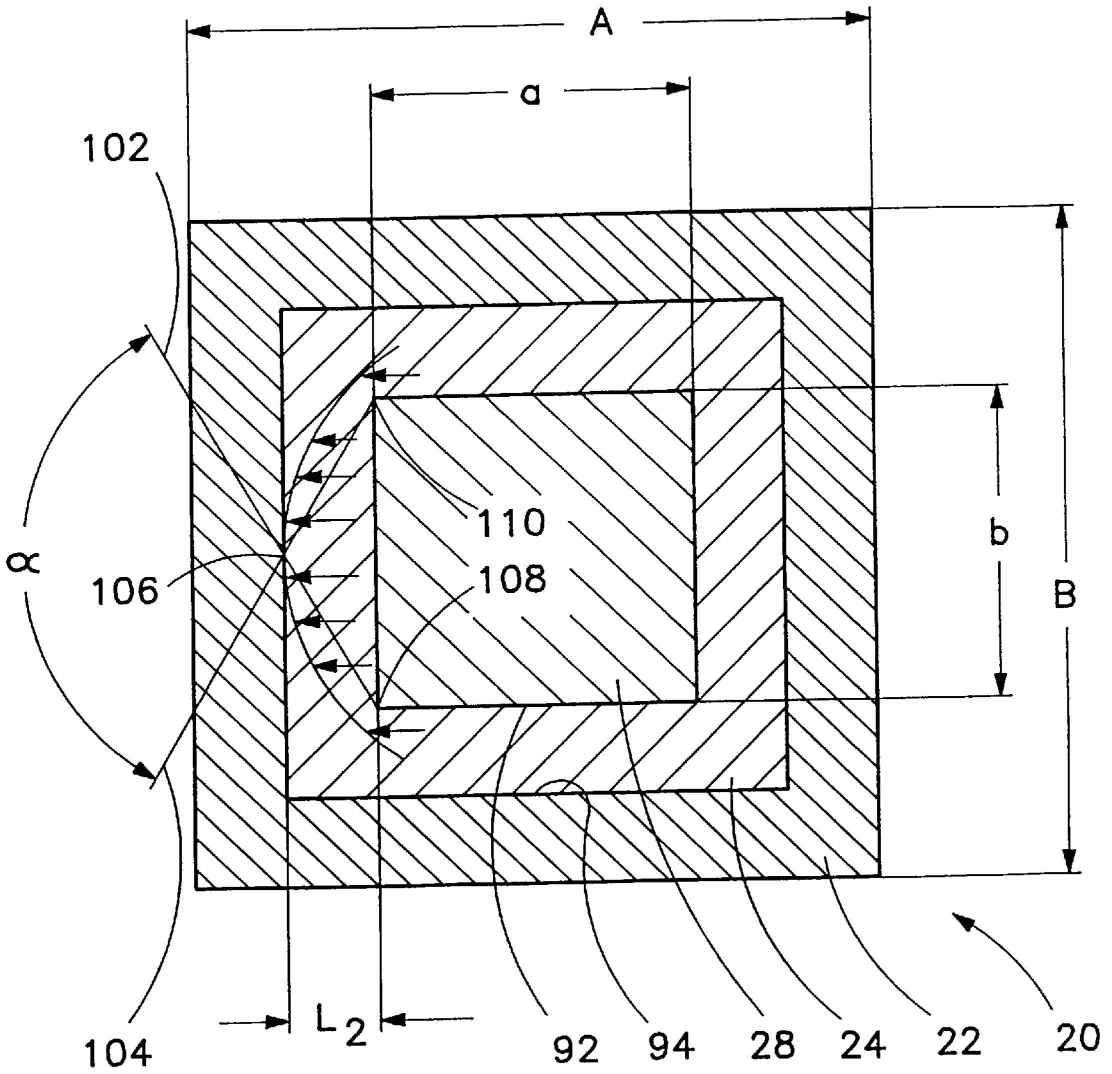
FIG. 11 is a schematic transverse cross-sectional view, taken exemplarily along plane P2 in FIG. 1, of the electromagnetic assembly of FIG. 1, showing selected preferred dimensions of the assembly.

With reference being made to FIG. 11, distance $L_2$ between casing 22 and cores 26 and 28, more specifically between outer surface 92 of movable magnetic core 28 and inner surface 94 of casing 22, should be such that an angle α between straight lines 102 and 104 passing through a center point 106 on inner surface 94 of casing 22 as well as through corner points 108 and 110 of stationary magnetic core 26 or movable magnetic core 28 is at least 150°. In FIG. 11, one edge of core 26 or 28 is indicated has having length b, while the other edge has length a. Similarly, two edges of casing 22 having lengths A and B. Where a=b and A=B, the electromagnetic assembly 20 is square in cross-section. Where a≠b and A≠B, the electromagnetic assembly 20 is more generally rectangular in cross-section.

That there is a preferred magnitude of angle α is evident from the following considerations. On the one hand, the greater edge length a, the greater the height or radius of a sphere formed by the magnetic field generated in the movable magnetic core 28 during energization of solenoid 24. It is the formation of this sphere and its merger with the inner wall or surface 94 of casing 22 which give rise to the side forces. On the other hand, the greater the distance $L_2$ between casing 22 and cores 26 and 28, the thicker the wire which can be used as part of solenoid 24. The thicker this wire, the less the energy loss when current passes through the solenoid 24. This optimization problem is solved experimentally to yield that the angle α should be approximately 150°.

Edge length a is selected using the criterion of torque, which is the driving force. It is established experimentally that when the distance between stationary magnetic core 26 and movable magnetic core 28, more particularly the distance between surfaces 50 and 52 (FIG. 3) is minimal (approximately 0.01 mm), one square centimeter of the free end surface 32 of movable magnetic core 28 develops a force of approximately 18 kg. The average driving force $F_{av}$ of the magnet, where the relationships among the various dimensions of the magnet are given by equations 1)–6) above, is given by the equations:

20) $F_{av}=\frac{2}{3}\cdot F_{max}$

21) $F_{max}=a^2\cdot 18\ kg/cm^2$ where $F_{max}$ is the maximum driving force.

For a given maximum torque $M_t$, edge length a is given by the following equation:

22) $a=\sqrt{M_{t/18\cdot d}}$ where d is the radius of the crank mechanism including crank rods 34 which converts translatory motion of movable magnetic core 28 into rotary motion of flywheel 36.

Figure 12:
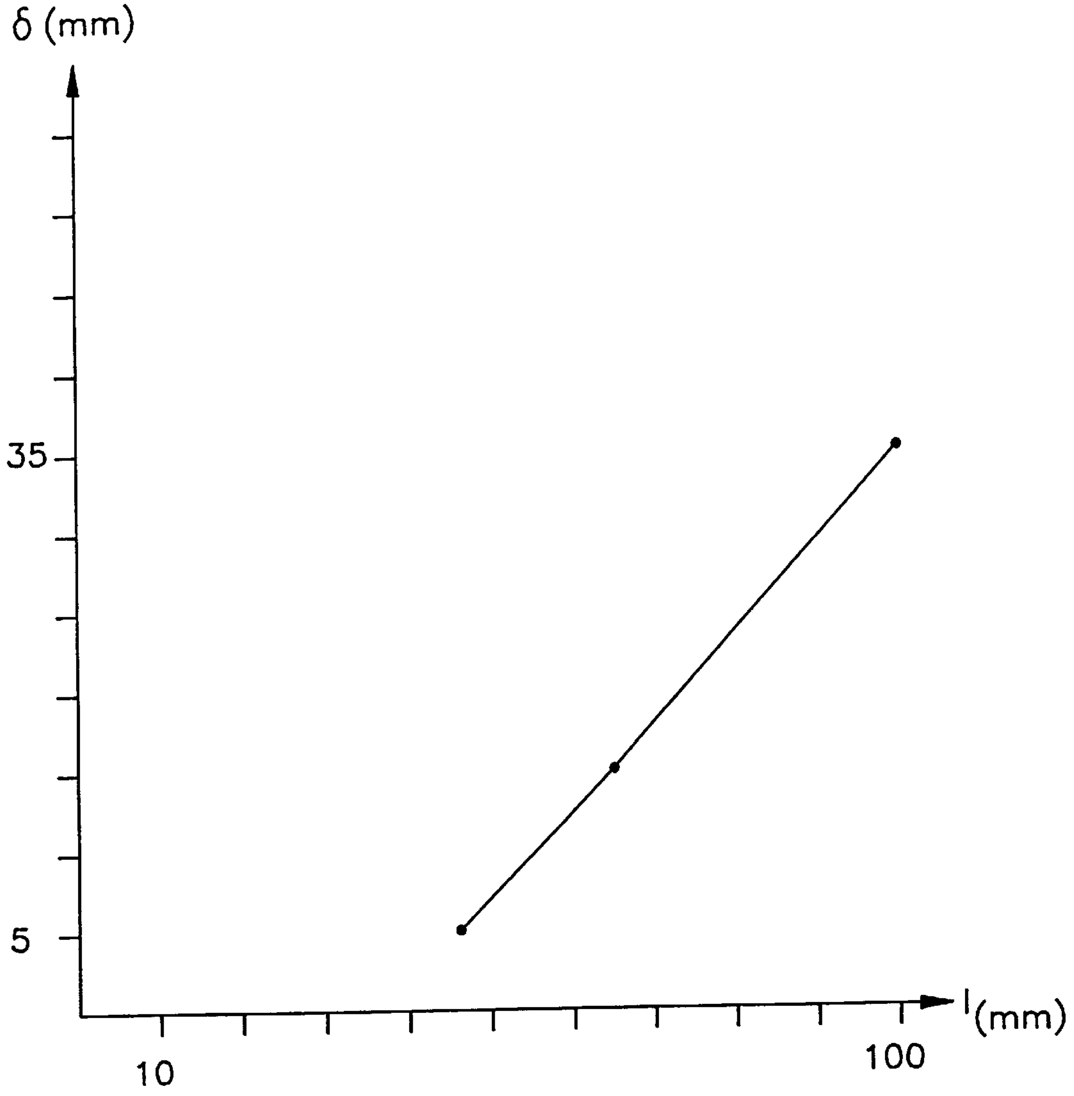
FIG. 12 is a graph showing effective stroke length of a movable magnetic core as a function of the length of the movable magnetic core.

Experiments on electromagnetic assemblies 20 with edge length a between 20 and 40 mm reveal the following relationships: a) when length K of solenoid 24 is 45 to 50 mm, the effective power stroke of movable magnetic core 28 is 5 to 7 mm; b) when length K of solenoid 24 is 60 to 65 mm, the effective power stroke of movable magnetic core 28 is approximately 15 mm; and c) when length K of solenoid 24 is 100 mm, the effective power stroke of movable magnetic core 28 is 35 mm. As illustrated in the graph of FIG. 12, dependence of the effective stroke length of movable magnetic core 28 on the length a of the movable magnetic core is approximately linear.

A competing consideration here is that an increase in stroke length increases the total mass of movable magnetic core 28, which in turn requires more energy for magnetization. In view of these competing considerations, it is believed that the optimal stroke length is generally 30 to 35 mm, although longer stroke lengths may be optimal in particular applications. Generally, the following relationship holds true:

23) $\delta=\gamma\cdot K$ where $\gamma$ is a constant having a value of approximately 0.3.

With respect to the material for magnetic cores 26 and 28 and casing 22, it is to be noted that relative magnetic permeability determines the least intensity of the magnetic field at which the material becomes magnetized. The greater the relative magnetic permeability, the weaker the electric current and the fewer the wire loops needed in solenoid 24 in order to magnetize cores 26 and 28 and casing 22. The following equation is used to compute energy E of the magnetic field generated owing to the flow of a current J in solenoid 24:

24) $E=J^2\cdot\mu_0\cdot\mu\cdot(N/K)^2\cdot V$ where $\mu_0$ is a magnetic constant, $\mu$ is the magnetic permeability of the cores 26 and 28 and the casing 22, N is the number of wire loops in solenoid 24, K is the length of solenoid 24, and V is the volume of the solenoid together with cores 26 and 28 and casing 22.

In all cases, in order to achieve the required work, it is necessary to create a magnetic field with energy E inside of the electromagnetic assembly 20. An increase in magnetic permeability of cores 26 and 28 and casing 22 allows one to achieve the same field energy E with less electric current for energizing solenoid 24 and/or fewer loops in solenoid 24. It is clearly beneficial to generate a magnetic field with minimal current, since this cuts back on heat losses in generating the field.

For electromagnetic assembly 20, a material which has a high magnetic permeability and which is conducive to achieving a high magnetic induction is preferable. Two types of magnetic material which are preferred are iron-silicon alloy having a magnetic permeability $\mu$ of 5,000 and a maximum field strength of 1.4–1.6 T1 and supermendure having a magnetic permeability $\mu$ of 20,000 and a maximum field strength of 2.0 T1.

The operation of the motor of FIG. 3 will now be explained in greater detail with reference to the power supply of FIG. 4. At the initial point of an operating cycle, that is, when movable magnetic core 28 is located at a maximum distance from stationary magnetic core 26, a potential of approximately 120 volts is applied across solenoid 24. Within time $\tau_0$, current in solenoid 24 reaches a predetermined value $J_c$ derived, for example, by calculation. Current is applied to solenoid 24 by closing transistor switches 60, 68 and 70 in FIG. 4. When the current in solenoid 24 reaches calculated value $J_c$, transistor switches 60 and 68 are opened, with the result that current continues to flow through transistor 70 and diode 72. This current is, of course, an induced current. As the energy in the magnetic field of assembly 20 is depleted, the current through transistor 70 and diode 72 falls 2 to 4%. Transistor switches 60 and 68 are then closed again to supply solenoid 24 with another energizing pulse of duration $\tau_0$. In this way, the current is maintained in solenoid 24 throughout the entire period that movable magnetic core 28 approaches stationary magnetic core 26. Upon attainment by movable magnetic core 28 of its maximally retracted position, the point of closest approach to stationary magnetic core 26, transistor switches 60, 68 and 70 are all opened. Induced current then begins to flow through diodes 62 and 64 and through voltage control transistor 66 to power source 74. Voltage control transistor 66 is required because without it a threshold current may send an extremely high voltage into the system.

In order to speed up the flow of current through solenoid 24, it is necessary to raise the voltage. Initially, voltage control transistor 66 blocks current from passing from the power source 74. Consequently, the voltage at a solenoid or coil in the power source increases. (This increase can be to as much as 1,000 volts, but eventually the transistors will burn out.) Once the required voltage has been attained, voltage control transistor starts conducting, thereby permitting an energizing pulse to be conducted. As a result of this current, the voltage drops and voltage control transistor 66 stops conducting. The process of the voltage rise in the circuit of FIG. 4 starts all over again.

Effectiveness of the motor of FIG. 3 is also determined by the operating speed of the system. Data shows that acceptable results are attainable if the frequency of oscillation of movable magnetic core 28 is approximately 50 Hz, which corresponds to 50 rotations of flywheel 36 per second. The period T is then 0.02 seconds. In addition, the following relationship must hold true:

25) $J^2\cdot R\cdot T<<E_M$ where $E_M$ is the mechanical work performed by the magnetic assembly 20 per cycle of operation and $J^2\cdot R\cdot T$ represents heat losses in the system per cycle.

It has been found that high operating speed and a reduction in heat losses are achievable when magnetic cores 26 and 28 and casing 2 are made of thin mutually isolated sheets of magneto-susceptible material. This construction reduces possible curl currents.

An engine incorporating electromagnetic assembly 20, as described hereinabove with reference to FIGS. 3 and 4, exhibits an enhanced efficiency over conventional electrical motors. It is believed that additional mechanical energy in the amount of 4–8 J per cycle can be extracted from an engine whose stationary magnetic core 26 and movable magnetic core 28 contain about 2 kg of iron, and which has a core stroke of 5 to 10 mm. This quantity excludes the approximately 5 J corresponding to the electrical energy consumption per cycle. It is commonly known that air conditioning efficiency is greater than 100% (excluding heat energy exchange with the environment), i.e., it is a common heat pump. In the present case, it is believed that electromagnetic assembly 22 functions in part as a magnetic "heat" pump, which when taking into account heat exchange with the environment, has an efficiency value that is naturally less than 100%. The following discussion considers this phenomenon step by step.

It is commonly known that ferromagnetic "soft"-magnetized metal without an external field divides itself into small areas, called domains (55 above), in which atomic magnetic momenta within the domain's bounds are all kept parallel to each other by the so-called "exchange forces." However, these moments are more or less easily reoriented when an external magnetic field is applied. This external field leaves most of the domain momenta parallel, possessing a minimal amount of energy of interaction, except for those domain momenta that are enclosed within the "domain bounds" or "inter-domain walls." While a piece of this type of magnet is being magnetized, the domain system is reorganized to increase the quantity of momenta that are oriented closer to the direction of the field. This effect can occur, however, by decreasing the number of bounds in which momenta direction is not parallel, but oriented as fan-shaped (from direction of one domain momenta to the direction of the momenta of the neighboring domain). Therefore, the exchange of energy between the magnetic momenta of the atoms is significantly greater next to the boundaries, than in the same volume of the domain itself. More importantly, during magnetization this energy must decrease, i.e. come out; and during demagnetization, on account of an increasing number of boundaries, the total sum of the energy must increase evidently, due to the absorption of energy from the environment.

In what quantity is the question. Energy of exchange per one atom of iron at room temperature is $2 \cdot 10^{-24}$ J/atom, which equals 21.5 kJ or 5.16 kcal per 1 kg of iron. The thickness of the domain boundaries in iron is about 300 m$\mu$m. When iron domain's microphotography was taken into account in an evaluation of the volume of the boundaries in demagnetized iron, the following results were obtained: this volume is approximately 1000/3 or 333 less than entire volume of the piece of iron. This yields 21500 J/333 or 64 J. It is also necessary to keep in mind that iron does not have anti-ferromagnetism, in which magnetic momenta are anti-parallel. This fact decreases that number further by a factor of two. The resulting boundary energy in iron yields 32 J per kg.

In what form can this energy be released during fast cyclic magnetization? Most probably in form of radiation, i.e., infrared energy, when slow convective heat exchange is eliminated. During demagnetization, when the external field is removed, the domain bounds appear again with their energy. This energy takes place chiefly, but not entirely, on account of the heat energy that was just radiated. It appears that part of the energy released by the boundaries is consumed for creating additional mechanical energy if the device provides such an opportunity. In the present case, the energy is used to generate an additional acceleration of engine's movable magnetic core by creating an additional magnetic field. However, not all the released boundary energy can be consumed in generating this additional magnetic field. In terms of thermodynamics, release of the above-mentioned heat energy is the more probable process. Moreover, the deeper the layers from the surface of the metal, the less energy will be released to the environment. Either way, a few joules of energy of the 32 J per 1 kg could be used for creating additional mechanical energy.

But if part of the boundary energy released per cycle is consumed "irretrievably," the same amount must be absorbed from the environment, thus causing the environment to cool. The engine model of FIG. 3 has worked for thousands of cycles and, unlike every conventional engine, no heating was observed. This is a "magnetic heat pump" in action. Such an engine clearly substantial uses and its environmental cooling, instead of the usual heating, is more positive in an ecological sense.

When one is choosing the shape of electromagnetic assembly 20, it is necessary to take into account two "competitive" lengths. One is the length K of solenoid 24 and the corresponding length of the inner walls 94 of casing 22 (the longer, the more effective). The other is the length of the closed magnetic line of force (the shorter, the larger the polar attraction force of the magnet, according to the formula describing this force). However, one must avoid the ideal cubic shape in order to utilize more completely the side attraction forces of the movable magnetic core 28 towards the walls of casing or armor 22 when the stroke of the movable magnetic core is sufficiently long. With a rectangular shape, it is easier to achieve the superior packing of sheets of laminated magnetic material, which is advantageous for the electromagnet construction that is supplied with a current or energization pulse of current of sufficient frequency. The main principal advantage is that the solenoid 24 more effectively utilizes the current when the cross section of the electromagnetic assembly 20 is rectangular rather than circular.

The engine of FIG. 3 is believed to produce mechanical energy that is equal to the electrical input energy with the addition of heat energy absorbed from the environment by means of ferromagnetic properties of the material that the electromagnetic assembly 20 is made from. Assembly 20 is a long-stroke armor-type electromagnet, which is distinguished by its square cross-section and its laminated stationary stator, including magnetic core 26 and casing 22, and it movable magnetic core or anchor 28. Core 28 executes a reciprocation motion due to electromagnetic forces, which arise because of the supply of pulses to solenoid 24 during the first stage or "working phase" of the engine cycle), and due to the internal momentum of flywheel 36 with the crank con-rod mechanism 34 (remaining three phases of the engine working cycle).

The supply to solenoid 24 of energization pulses having frequency of 30 to 50 pulses per second is implemented by using the method of pulse width modulation (PWM) to obtain a greater electromagnetic inductance in the main part of the stator and the core with the same value of the current than in a round-shaped solenoid.

Let us consider the pulse current J in the solenoid with applied voltage U constant during time interval $\pi$. This yields the following electrical energy of the engine supply per working cycle: $E_1=JU\pi$. At a low active solenoid resistance r (about 1 Ohm), the heat loss per cycle is also extremely small: $Q=J^2r\pi$. The portion of Q of energy $E_1$ must at the end of the "working phase" be transformed into magnetic field energy $E_2=J^2L/2$, where L is the inductance of the electromagnet at this moment. It is intended that during the working phase the engine's core 28 moves and approaches the stationary magnetic pole of the stator, i.e., stationary magnetic core 26, during which the inductance of the system grows (approximately 10 times) from the inductance $L_0$ at the beginning up to the final inductance L at the end. The described engine differs also by the presence of an energy recuperation system (that returns energy to the power supply) whose maximal energy value is $E_2$. In reality, less energy is returned to the power supply.

During pulse time interval $\pi$, the engine's core accelerates and finally attains the kinetic energy $E_3$. It is believed that the value of this energy will be much greater than the consumed energy from power supply $E_1$, or very close to $E_2$. It is also believed that the reason for this is related to the domain boundary energy exchange, which releases during demagnetization, from the "soft" ferromagnetic material that the engine's stator and core are made from. An additional reason is heat energy exchange between the engine and the environment. Such an explanation is in complete accordance with the law of conservation of energy. This invention provides an opportunity for creating extremely economic electric engines with a wide range of uses from common appliances to electric automobiles.

Figure 13:
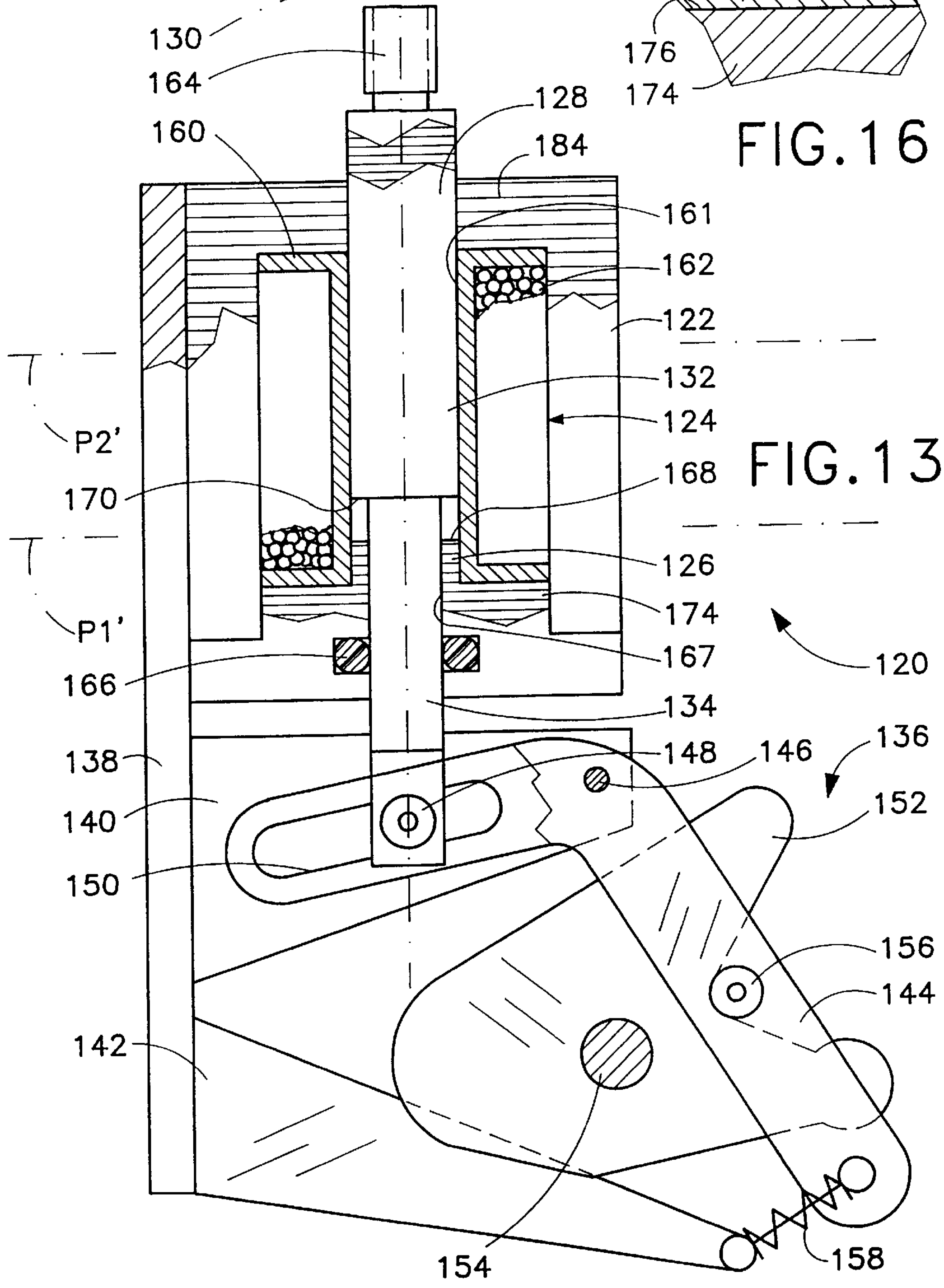
FIG. 13 is a schematic side elevational view, partly broken away, of an electromagnetic assembly with a restoring mechanism for a reciprocating magnetic core, in accordance with the present invention.

As illustrated in FIG. 13, a modified electromagnetic assembly 120 with a reciprocatable magnetic core 128 comprises a casing 122, a solenoid 124 disposed inside the casing, and a stationary magnetic core 126 integral with or fixed to the casing. Stationary magnetic core 126, movable magnetic core 128, and casing 122 are made of magneto-susceptible material. Stationary magnetic core 126 is disposed at least partially inside solenoid 124 and is fixed relative to the solenoid and casing 122, while movable magnetic core 128 is disposed for reciprocation partially inside the solenoid along an axis 130. Stationary magnetic core 126 and movable magnetic core 128 have polygonal cross-sections in planes P1', P2' oriented essentially perpendicularly to axis 130. More specifically, cores 126 and 128 have a rectangular or square cross-section in planes P1', P2'.

Movable magnetic core 128 is free to reciprocate with a varying proportion of the movable core being located outside of solenoid 124 and casing 122. An inner end 132 (inside solenoid 124) of movable magnetic core 128 is operatively coupled via a push rod 134 to a restoring mechanism 136. Restoring mechanism 136 functions to return movable magnetic core 128 to a maximally extended position at which movable magnetic core 128 is located at a maximum distance from stationary magnetic core 126.

Electromagnetic assembly 120 is mounted via a support base 138 to a pair of brackets or mounting arms 140 and 142 which carry restoring mechanism 136. Mechanism 136 includes a dog-leg-shaped lever 144 swingably mounted via a pivot pin 146 to bracket 140. A roller 148 rotatably secured to an outer end of push rod 134 traverses a slot 150 in lever 144. Restoring mechanism 136 also includes a cam 152 turnably mounted to a shaft 154. A camming roller 156 rotatably secured to lever 144 rides against cam 152. A tension spring 158 is connected at one end to bracket 142 and at an opposite end to lever 144 for maintaining camming roller 156 in rolling contact with cam 152.

Solenoid 124 is representative of solenoid 24 and includes a spool 160 which carries a wound insulated wire 162. Solenoid 124 and casing 122 have the same polygonal or, more specifically, rectangular, shape as stationary magnetic core 126 and movable magnetic core 128. Stationary magnetic core 126 and movable magnetic core 128 are shaped to fit tightly in solenoid 124, while casing 122 has the same shape as the outside profile of solenoid 124.

Spool 160 is made of hard polyurethane vacuum plated with a layer of aluminum, a layer of zinc, and a layer of nickel. Solenoid 24 having a cavity surface 161 lapped with movable magnetic core 28 in a manufacturing process. The layer of aluminum has a thickness of 4 to 5 $\mu$m, the layer of zinc has a thickness of 2 to 3 $\mu$m, and the layer of nickel has a thickness of 50 to 60 $\mu$m.

At a free end, opposite push rod 134, movable magnetic core 128 is provided with a threaded pin 164 for facilitating attachment to a load (not shown). Reference numeral 166 designates an O-ring in sliding contact with push rod 134. Push rod 134 traverses a bore or through hole 167 in stationary magnetic core 126.

The operation and efficiencies of electromagnetic assembly 120 is essentially described hereinabove with reference to FIGS. 1–4, except with respect to the functioning of restoring mechanism 136. As discussed above, electrical energy is transformed into mechanical energy all within a space enclosed by casing 122. Casing 122 serves in part at least to reduce losses of electromagnetic field energy. The poles of the stator (including casing 122 stationary magnetic core 126) and the rotor (movable magnetic core 28) interact perpendicularly to the opposing surfaces 168 and 170 of stationary magnetic core 126 and movable magnetic core 128. When movable magnetic core 128 is located at a maximum distance from stationary magnetic core 126, an electrical current is conducted through solenoid 124. Preferably, the current grows rapidly to achieve a predetermined value in a shortest possible time. Magnetic forces generated by the current flow through solenoid 124 cause movable magnetic core 128 to be drawn into the solenoid. Movable magnetic core 128 thus executes a power stroke which starts from the maximally extended position in which the movable magnetic core is located at the maximum distance from stationary magnetic core 126. The motion of core 128 pushes rod 134 out of casing 122 and concomitantly pivots lever 144 in a counterclockwise direction about pivot pin 146 in opposition to the force exerted by spring 158. Alternatively, cam 152 may be operatively connected to push rod 134 via camming roller 156 for restoring the push rod to a withdrawn position prior to a moving of movable magnetic core 128 along axis 130 from the maximally extended position to a maximally retracted position. When the distance between movable magnetic core 128 and stationary magnetic core 126 reaches a minimum, for example, 0.5 to 1 mm, the supply of electrical current to solenoid 124 ceases. At that time, under the action of spring 158, lever 144 begins to pivot in the clockwise direction about pin 146 and to shift push rod 134 in an upward direction to thereby restore movable magnetic core 128 to its maximally extended position.

Push rod 134 may have a cylindrical outer surface (not separately designated) coated with a nickel layer and an outer copper layer. In that case, the layer of copper preferably has a thickness of 45 to 50 $\mu$m and the layer of nickel preferably has a thickness of 50 to 60 $\mu$m. Generally, push rod 134, stationary magnetic core 126 and movable magnetic core 128 are all made of the same material.

Figure 14:
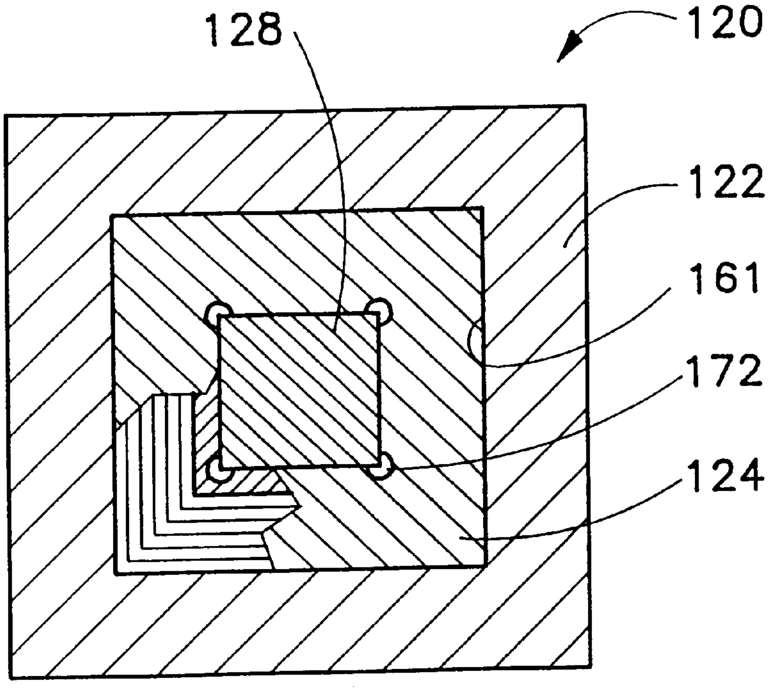
FIG. 14 is a schematic transverse cross-sectional view taken along plane P2' in FIG. 13.
Figure 15:
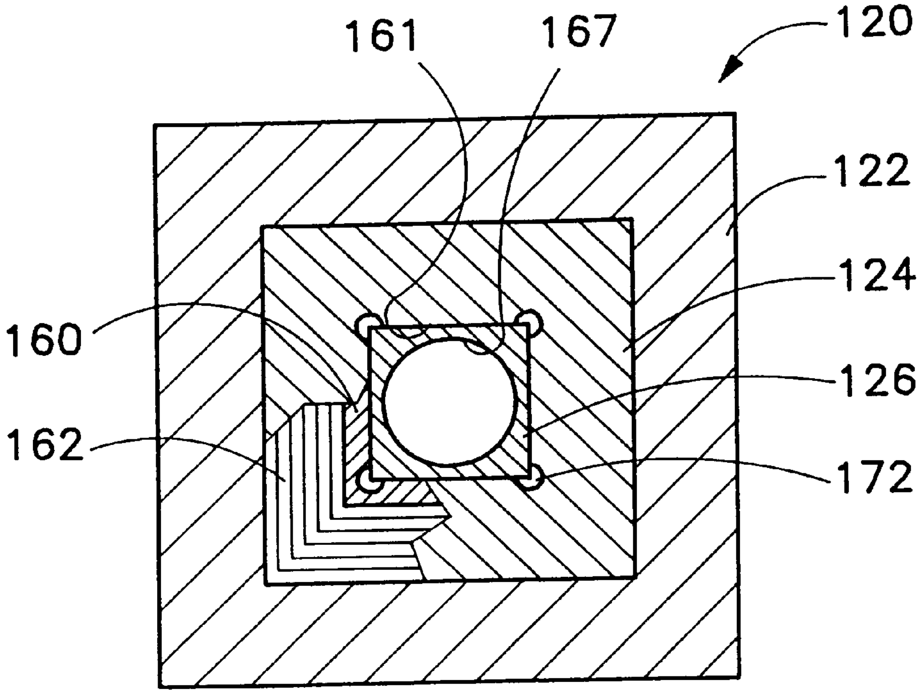
FIG. 15 is a schematic transverse cross-sectional view taken along plane P1' in FIG. 13.

As illustrated schematically in FIGS. 14 and 15, cavity surface 161 of spool 160 is provided along longitudinally extending edges (not separately designated) with elongate oil channels or passageways 172 extending parallel to axis 130. Passageways 172 communicate with cavity surface 161 for lubrication purposes. Such oil passageways may be provided in solenoid 24 of electromagnetic assembly.

Figure 16:
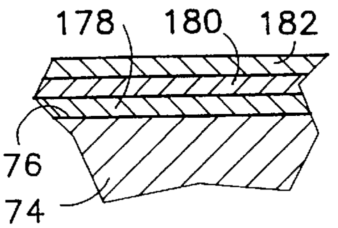
FIG. 16 is a partial cross-sectional view, on an enlarged scale, of a metal fin of a stationary magnetic core shown in FIG. 13.

As illustrated further in FIG. 13, stationary magnetic core 126 of electromagnetic assembly 120 is manufactured from a plurality of steel fins 174 bonded to each other along planes extending generally perpendicularly to axis 130 of the device. As depicted in FIG. 16, steel fins 174 have outer surfaces 176 vacuum plated with a layer of aluminum 178, a layer of zinc 180, and a layer of nickel 182. Aluminum layer 178 preferably has a thickness of 4 to 5 μm, zinc layer 180 preferably has a thickness of 2 to 3 μm, and nickel layer 182 preferably has a thickness of 50 to 60 μm.

Similarly, casing 122 is constructed of a plurality of steel fins 184 bonded to each other. As illustrated in FIG. 16 with respect to steel fins 174 of stationary magnetic core 126, fins 184 of casing 122 have outer surfaces vacuum plated with a layer of aluminum, a layer of zinc, and a layer of nickel. The layer of aluminum has a thickness of 4 to 5 μm, the layer of zinc has a thickness of 2 to 3 μm, and the layer of nickel has a thickness of 50 to 60 μm.

Solenoid 124 and casing 122 are coaxially and symmetrically disposed about axis 130, where axis 130 is an axis of symmetry of stationary magnetic core 126 and movable magnetic core 128. Space between working surfaces of stationary magnetic core 126 and movable magnetic core 128 and walls of spool 160 is filled with grease. These same considerations are applicable to electromagnetic assembly 20 of FIGS. 1–4.

The inductance of an electromagnetic system including the reciprocating magnet assembly 20 or 120 and an electrical power supply circuit 54 (FIGS. 3 and 4) may be additionally controlled via an external inductor 186 (FIG. 3), such as a saturable reactor, having a variable inductance. This external ductor 186 is placed in series with solenoid 24 or 124 for stabilizing the magnetization speed of casing 22 or 122 and concomitantly decreasing the growth rate (rate of increase) of the current. External inductor 186 is controlled to increase the system's inductive resistance, while maintaining a low active resistance, thereby permitting an acceleration of the electromagnetic saturation, a reduction in power consumption, an augmentation of the thrust of the mobile core, and a reduction in heat loss.

It is to be noted that in the intervals between the energizing pulses from power supply 54 during a power or inwardly directed stroke of movable magnetic core 28 there is a minor recuperation of energy from the magnetic field by the magnetic domains of stationary magnetic core 26, movable magnetic core 28 and casing 22. During a return or outwardly directed stroke of movable magnetic core 28, there is a major energy recuperation, not only by the magnetic domains of stationary magnetic core 26, movable magnetic core 28 and casing 22 but also by the power source 74.

Figure 17:
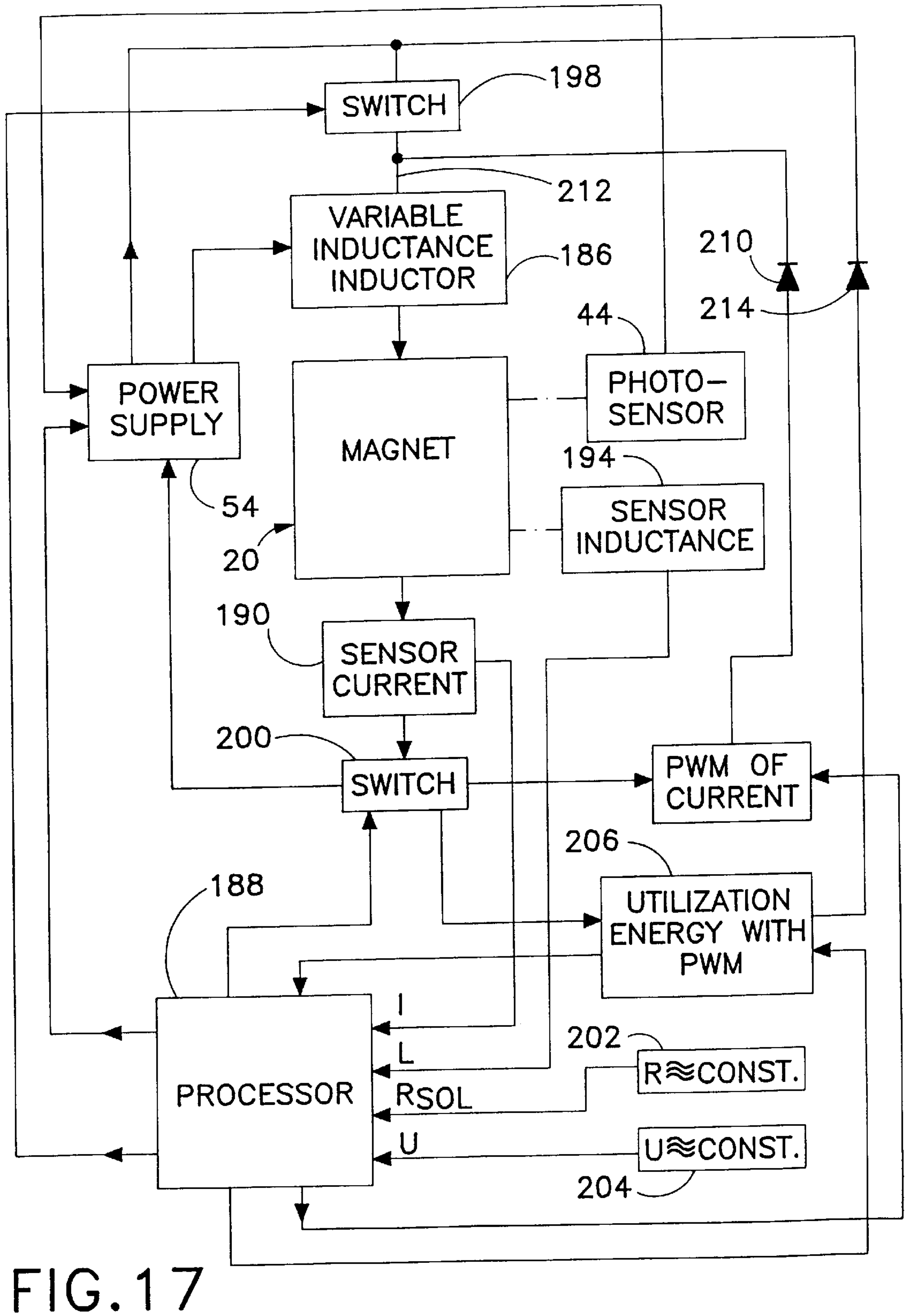
FIG. 17 is a block diagram showing circuit elements for controlling the electromagnetic assembly of FIGS. 1 and 3.

FIG. 17 illustrates circuit elements for controlling the operation of electromagnetic assembly 20. Some of the elements are illustrated in FIG. 3. Other elements have counterparts in FIG. 4.

As illustrated in FIGS. 3 and 17, a microprocessor 188 is provided for controlling the energization of electromagnetic assembly 20. Processor 188 receives input from a current sensor 190 which is operatively connected to power supply 54 and solenoid 24 for measuring the current supplied to the solenoid by the power supply. Processor 188 receives additional input from a speed sensor 192 and an inductance sensor 194. Speed sensor 192 is operatively coupled to movable magnetic core 28 for detecting the velocity thereof, while inductance sensor 194 is operatively linked to electromagnetic assembly 20 for measuring the instantaneous inductance thereof, for example, with the help of measuring magnetic field dissipation. Processor 188 is connected to a controller or driver 196 in turn connected to inductor 186 for adjusting the variable inductance thereof in response to control signals from processor 188.

At the beginning of an operating cycle, processor 188 sends a signal to a pair of switches 198 and 200 to close those switches and thereby enable the application of a voltage by power supply 54 across solenoid 24 (FIGS. 1 and 3). (Switches 198 and 200 thus perform a function undertaken by transistor switches 60, 68, 72 in FIG. 4.) The application of a voltage to solenoid 24 results in the conduction of current therethrough and the generation of a magnetic filed in electromagnetic assembly 20. An interaction force arises between movable magnetic core 28, on the one hand, and stationary magnetic core 26 and the side walls of magnetic assembly 20, on the other hand. This force causes movable magnetic core to starting moving. As a result of the movement of magnetic core 28, the following parameters of the system change: (1) inductance of assembly 20, (2) speed of movement of movable magnetic core 28, (3) the electric current passing through solenoid 24, and (4) the power used. These parameters are monitored and controlled by processor 188.

As discussed above, the inductance of electromagnetic assembly 20 varies as a function of the displacement or degree of extension of movable magnetic core 28. This inductance is measured by sensor 194. In response, processor 188 transmits a signal to controller 196 (FIG. 3) to adjust the inductance of variable-inductance inductor 186 so that the sum of the instantaneous inductances of assembly 20 and inductor 186 remains at a constant value $R_{const}$. This constant $R_{const}$ is stored in encoded form in a register 202 and may be changed by an operator.

During an inwardly directed stroke of movable magnetic core 28, processor 188 works to ensure the application of voltage pulses to solenoid 24, as discussed above. In response to feedback from speed sensor 192 (FIG. 3) and in response to the power utilization (a function of voltage and current, calculatable by processor 188), the processor opens switches 198 and 200 when movable magnetic core 28 reaches a preselected speed and/or when power consumption attains a preset level $U_{const}$ lodged in encoded form in a register 204. Processor 188 may calculate the speed of movable magnetic core 28 as a function of the rate of change of the inductance of electromagnetic assembly 20.

As described above, processor 188 monitors the instantaneous inductance of electromagnetic assembly 20 to determine when that inductance reaches a preset value corresponding to a minimal gap between movable magnetic core 28 and stationary magnetic core 26. At that juncture, processor 188 opens switches 198 and 200 to disrupt the application of voltage to solenoid 24. In addition, processor 188 transmits a signal to an energy utilization module 206 to enable the return of stored energy to power supply 54. The time needed for energy utilization is shortened by continuous monitoring by processor 18 of the forcing voltage applied to solenoid 24 by supply 54. When the forcing voltage reaches a set level, energy utilization module 206 ends any induction current back to power supply 54, as described above. This process is executed using pulse width modulation as described hereinafter with reference to FIG. 18. This pulse width modulation is implement by a PWM module 208 (FIG. 17) operatively connected via a diode 210 to a circuit path 212 including switch 198 and solenoid 24 of electromagnetic assembly 20. Energy utilization module 206 is connected to circuit path 212 via switch 198 and a diode 214.

Figure 18:
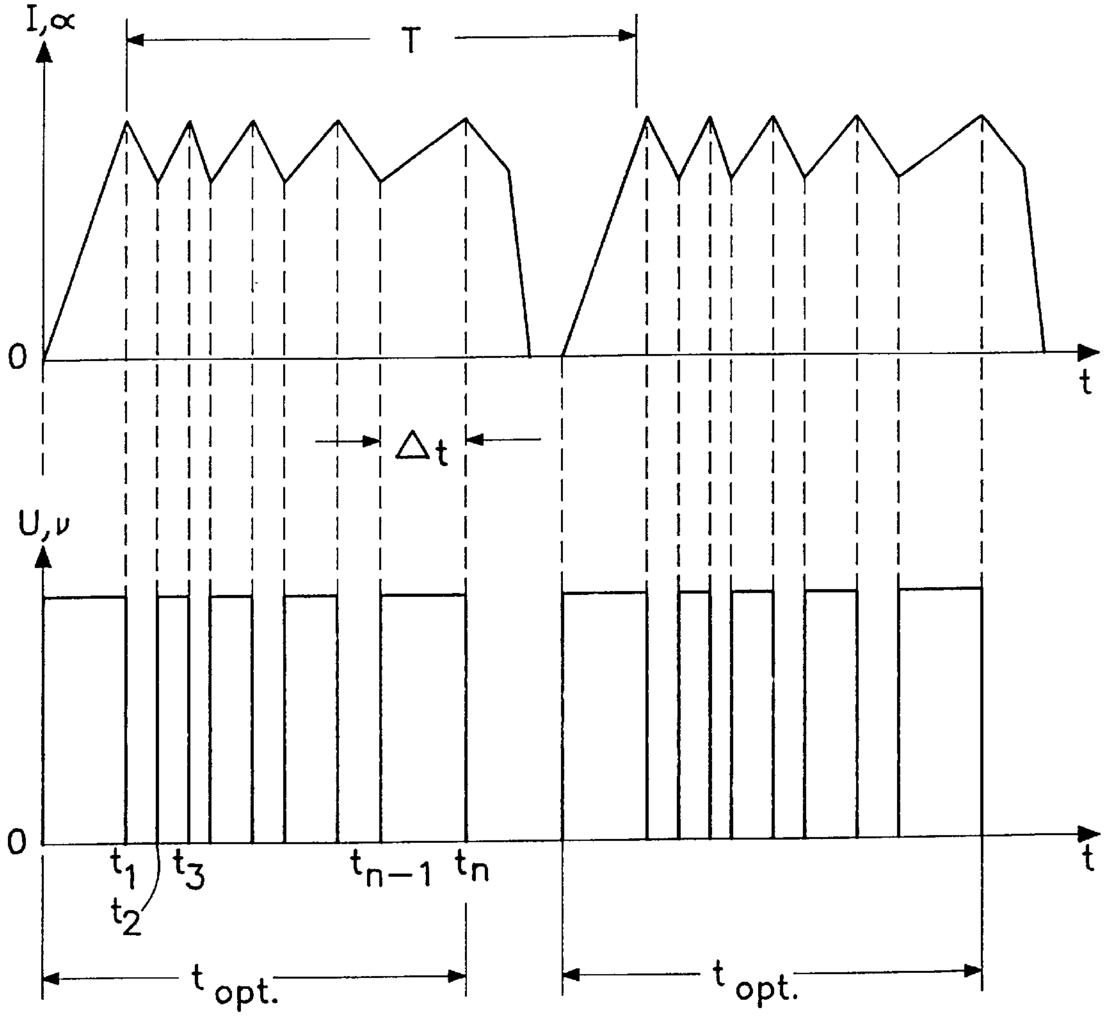
FIG. 18 is a pair of ganged graphs showing voltage applied and resulting current as a function of time over two operating cycles of the electromagnetic assembly.

FIG. 18 is a graph depicting, on respective ordinate axes, voltage U applied to solenoid 24 and current I passing therethrough as a function of time t. At time t=0, the beginning of an operating cycle of electromagnetic assembly 20, a predetermined voltage is applied to solenoid 24. As a result, current begins to be conducted through the solenoid and increases at a constant rate. A magnetic flux is generated as a result of the current flow, and movable magnetic core 28 begins to move in response to the concomitant magnetic interaction force. At time $t=t_1$, the applied voltage is shut off, upon a determination that various parameters of the electromagnetic system have attained values meeting the equation:

$$[I_{AV}^2 \cdot L(t)]/2+I_{AV}^2 \cdot R_{const} \cdot \Delta t=\text{constant},$$

where $I_{AV}$ is the average current, L(t) is the instantaneous inductance of electromagnetic assembly 20, and $R_{cosnst}$ is the constant value described above. In FIG. 18, T represents a period of operation (1/T is the frequency of reciprocation of movable magnetic core 28).

Once the voltage is shut off, energy stored in the magnetic field of electromagnetic assembly 20 begins to decrease. Meanwhile the speed of the movable magnetic core 28 decreases and the inductance continuously increases. When, at time $t=t_2$, the energy drops below a certain level, which is determined by the program hysteresis of the system as stored in processor 188, voltage is again applied to solenoid 24. The system continues to operate in this manner to time $t=t_n$ at which time the power supply 54 is completely disconnected from solenoid 24 and the internal system parameters stabilization system is blocked. Simultaneously, processor 188 sends a signal to activate the system which utilizes the energy stored in the magnetic field. The system is analyzed and impulses of a preselected power return the energy to the power supply.

Although the invention has been described in terms of particular embodiments and applications, one of ordinary skill in the art, in light of this teaching, can generate additional embodiments and modifications without departing from the spirit of or exceeding the scope of the claimed invention. For example, casing 22, solenoid 24, and cores 26 and 28 may have polygonal shapes other than rectangular or square. Triangular cross-sections may be used, as well as pentagons and more complex shapes.

Accordingly, it is to be understood that the drawings and descriptions herein are proffered by way of example to facilitate comprehension of the invention and should not be construed to limit the scope thereof

What is claimed is:

1. A magnetic assembly comprising:

a casing;

a solenoid disposed inside said casing;

a stationary magnetic core disposed at least partially inside said solenoid, said stationary core being fixed relative to said solenoid and said casing; and a movable magnetic core disposed for reciprocation partially inside said solenoid along an axis, said solenoid having a solenoid length and said casing having a symmetry plane oriented transversely to said axis, said stationary magnetic core being spaced from said symmetry plane by a distance of approximately one quarter of said solenoid length less 1 to 4 mm.

2. The assembly defined in claim 1 wherein said movable magnetic core has an inner end always disposed inside said solenoid and said casing and an outer end always located outside said solenoid and said casing.

3. The assembly defined in claim 2 wherein said casing has a casing length, said movable magnetic core having a length greater than one-half of said casing length.

4. The assembly defined in claim 1 wherein said solenoid has a wall thickness of less than approximately 9 mm.

5. The assembly defined in claim 4 wherein said movable magnetic core has an outer surface and said casing has an inner surface, said outer surface being spaced from said inner surface by a distance of less than approximately 10 mm.

6. The assembly defined in claim 5 wherein said wall thickness differs from said distance by less than 1 mm.

7. The assembly defined in claim 1 wherein said symmetry plane essentially bisects said solenoid.

8. The assembly defined in claim 1 wherein said stationary magnetic core has a core length measured along said axis, said core length being approximately one quarter of said solenoid length.

9. The assembly defined in claim 1 wherein said cross-section is rectangular.

10. The assembly defined in claim 9 wherein said cross-section is square.

11. The assembly defined in claim 1, further comprising a current source operatively connected to said solenoid, said movable magnetic core being operatively connected to a load, whereby the assembly acts as an motor.

12. The assembly defined in claim 1, further comprising means for restoring said movable magnetic core from a maximally retracted position to a maximally extended position, said movable magnetic core having a maximum proportion of its length located inside said solenoid and said casing in said maximally retracted position and a minimum proportion of its length located inside said solenoid and said casing in said maximally extended position.

13. The assembly defined in claim 12 wherein said stationary magnetic core is manufactured from a plurality of steel fins bonded to each other along planes extending generally perpendicularly to said axis, said steel fins having outer surfaces vacuum plated with a layer of aluminum, a layer of zinc, and a layer of nickel, said stationary magnetic core having a through hole traversed by said push rod, said through hole being lapped by said push rod in a manufacturing process.

14. The assembly defined in claim 13 wherein said layer of aluminum has a thickness of 4 to 5 $\mu$m, said layer of zinc has a thickness of 2 to 3 $\mu$m, and said layer of nickel has a thickness of 50 to 60 $\mu$m.

15. The assembly defined in claim 12 wherein said means for restoring includes a spring.

16. The assembly defined in claim 1 wherein said solenoid and said casing are coaxially and symmetrically disposed about said axis.

17. The assembly defined in claim 1 wherein said stationary magnetic core and said movable magnetic core have polygonal cross-sections in planes oriented essentially perpendicularly to said axis, said casing and said solenoid also having polygonal cross-sections in said planes oriented essentially perpendicularly to said axis.

18. The assembly defined in claim 1 wherein said casing is made of magnetic material.

19. The assembly defined in claim 1 wherein said axis is an axis of symmetry of said stationary magnetic core and said movable magnetic core and wherein said solenoid is symmetrical about said axis.

20. The assembly defined in claim 1 wherein said stationary magnetic core is integral with said casing.

21. A magnetic assembly comprising:

a casing;

a solenoid disposed inside said casing;

a stationary magnetic core disposed at least partially inside said solenoid, said stationary core being fixed relative to said solenoid and said casing; and a movable magnetic core disposed for reciprocation partially inside said solenoid along an axis, said movable magnetic core having an inner end always disposed inside said solenoid and said casing and an outer end always located outside said solenoid and said casing, said casing having a casing length, said movable magnetic core having a length greater than one-half of said casing length, said casing having a symmetry plane oriented transversely to said axis, said casing having a mouth opening traversed by said movable magnetic core, said movable magnetic core having a reciprocation stroke with an extreme position where said inner end is located on a side of said symmetry plane opposite said mouth opening.

22. The assembly defined in claim 21 wherein said inner end is disposed at less than approximately 4 mm from said symmetry plane in said extreme position of said movable magnetic core.

23. A magnetic assembly comprising:

a casing;

a solenoid disposed inside said casing;

a stationary magnetic core disposed at least partially inside said solenoid, said stationary core being fixed relative to said solenoid and said casing; and a movable magnetic core disposed for reciprocation partially inside said solenoid along an axis, said stationary magnetic core and said movable magnetic core having rectangular cross-sections in planes oriented essentially perpendicularly to said axis, said casing and said solenoid also having rectangular cross-sections in said planes oriented essentially perpendicularly to said axis.

24. A magnetic assembly comprising:

a casing;

a solenoid disposed inside said casing;

a stationary magnetic core disposed at least partially inside said solenoid, said stationary core being fixed relative to said solenoid and said casing;

a movable magnetic core disposed for reciprocation partially inside said solenoid along an axis; and a current source operatively connected to said solenoid, said movable magnetic core being operatively connected to a load, whereby the assembly acts as an motor, said current source including means for initiating an energization of said solenoid when said movable magnetic core is located at a maximum distance from said stationary magnetic core.

25. The assembly defined in claim 24 wherein said load includes means for restoring said movable magnetic core from a maximally retracted position to a maximally extended position, said movable magnetic core having a maximum proportion of its length located inside said solenoid and said casing in said maximally retracted position and a minimum proportion of its length located inside said solenoid and said casing in said maximally extended position.

26. A magnetic assembly comprising:

a casing;

a solenoid disposed inside said casing;

a stationary magnetic core disposed at least partially inside said solenoid, said stationary core being fixed relative to said solenoid and said casing;

a movable magnetic core disposed for reciprocation partially inside said solenoid along an axis; and means for restoring said movable magnetic core from a maximally retracted position to a maximally extended position, said movable magnetic core having a maximum proportion of its length located inside said solenoid and said casing in said maximally retracted position and a minimum proportion of its length located inside said solenoid and said casing in said maximally extended position, said means for restoring including a push rod extending along said axis through said stationary magnetic core.

27. The assembly defined in claim 26 wherein said push rod has a cylindrical outer surface coated with a nickel layer and an outer copper layer.

28. The assembly defined in claim 27 wherein said layer of copper has a thickness of 45 to 50 $\mu$m and said layer of nickel has a thickness of 50 to 60 $\mu$m.

29. The assembly defined in claim 26 wherein said push rod, said stationary magnetic core and said movable magnetic core are all made of the same material.

30. The assembly defined in claim 26, further comprising means operatively connected to said push rod for restoring said push rod to a withdrawn position prior to a moving of said movable magnetic core along said axis from said maximally extended position to said maximally retracted position.

31. A magnetic assembly comprising:

a casing;

a solenoid disposed inside said casing;

a stationary magnetic core disposed at least partially inside said solenoid, said stationary core being fixed relative to said solenoid and said casing;

a movable magnetic core disposed for reciprocation partially inside said solenoid along an axis, and means for supplying to said solenoid an electrical potential in the form of a series of transient electrical pulses having a phase synchronized with a reciprocating stroke of said movable magnetic core.

32. The assembly defined in claim 31 wherein said pulses have a sawtooth profile to maximize magnetization for a given average current value.

33. The assembly defined in claim 32 wherein said average current value is approximately one-half of a maximum current value of said pulses.

34. The assembly defined in claim 31 wherein said pulses have a width or duration which is pulse width modulated according to an instantaneous inductance of said device.

35. A magnetic assembly comprising:

a casing;

a solenoid disposed inside said casing;

a stationary magnetic core disposed at least partially inside said solenoid, said stationary core being fixed relative to said solenoid and said casing;

a movable magnetic core disposed for reciprocation partially inside said solenoid along an axis; and an electrical circuit operatively connected to said solenoid for energizing same, said circuit including an additional inductor with a variable inductance.

36. The assembly defined in claim 35 wherein said casing is made of magnetic material, said electrical circuit including a power supply and means for periodically disconnecting said power supply from said solenoid during reciprocating of said movable magnetic core, thereby permitting energy recuperation in magnetic material of at least one of said casing, said stationary magnetic core and said movable magnetic core.

37. A magnetic assembly comprising:

a casing;

a solenoid disposed inside said casing;

a stationary magnetic core disposed at least partially inside said solenoid, said stationary core being fixed relative to said solenoid and said casing; and a movable magnetic core disposed for reciprocation partially inside said solenoid along an axis, said solenoid including a coil holder or spool of hard polyurethane vacuum plated with a layer of aluminum, a layer of zinc, and a layer of nickel, said solenoid having a cavity surface lapped with said movable magnetic core in a manufacturing process.

38. The assembly defined in claim 37 wherein said layer of aluminum has a thickness of 4 to 5 $\mu$m, said layer of zinc has a thickness of 2 to 3 $\mu$m, and said layer of nickel has a thickness of 50 to 60 $\mu$m.

39. The assembly defined in claim 37 wherein said stationary magnetic core and said movable magnetic core have polygonal cross-sections in planes oriented essentially perpendicularly to said axis and wherein said solenoid has a polygonal cross-section in planes oriented essentially perpendicularly to said axis, said spool defining a spool cavity having edges extending parallel to said axis, said edges being provided with elongate oil channels extending parallel to said axis.

40. A magnetic assembly comprising:

a casing;

a solenoid disposed inside said casing;

a stationary magnetic core disposed at least partially inside said solenoid, said stationary core being fixed relative to said solenoid and said casing; and a movable magnetic core disposed for reciprocation partially inside said solenoid along an axis, said solenoid having a first length, said casing has a second length, and said movable magnetic core has a reciprocation stroke of a third length, said first length being greater than third length, said second length being equal to approximately a sum of said first length and said third length.

41. The assembly defined in claim 40 wherein said stationary core has a portion with a fourth length disposed inside said solenoid, said fourth length being at least one-third of said third length.

42. A magnetic assembly comprising:

a casing;

a solenoid disposed inside said casing;

a stationary magnetic core disposed at least partially inside said solenoid, said stationary core being fixed relative to said solenoid and said casing; and a movable magnetic core disposed for reciprocation partially inside said solenoid along an axis, said casing being constructed of a plurality of steel fins bonded to each other and having outer surfaces vacuum plated with a layer of aluminum, a layer of zinc, and a layer of nickel.

43. The assembly defined in claim 42 wherein said layer of aluminum has a thickness of 4 to 5 $\mu$m, said layer of zinc has a thickness of 2 to 3 $\mu$m, and said layer of nickel has a thickness of 50 to 60 $\mu$m.

44. A magnetic assembly comprising:

a casing;

a solenoid disposed inside said casing;

a stationary magnetic core disposed at least partially inside said solenoid, said stationary core being fixed relative to said solenoid and said casing; and a movable magnetic core disposed for reciprocation partially inside said solenoid along an axis, said stationary magnetic core being manufactured from a plurality of steel fins bonded to each other along planes extending generally perpendicularly to said axis, said steel fins having outer surfaces vacuum plated with a layer of aluminum, a layer of zinc, and a layer of nickel.

45. The assembly defined in claim 44 wherein said layer of aluminum has a thickness of 4 to 5 $\mu$m, said layer of zinc has a thickness of 2 to 3 $\mu$m, and said layer of nickel has a thickness of 50 to 60 $\mu$m.

46. A magnetic assembly comprising:

a casing;

a solenoid disposed inside said casing;

a stationary magnetic core disposed at least partially inside said solenoid, said stationary core being fixed relative to said solenoid and said casing; and a movable magnetic core disposed for reciprocation partially inside said solenoid along an axis, said solenoid including a coil holder or spool having walls, said stationary magnetic core and said movable magnetic core having working surfaces, said working surfaces and said walls defining a space therebetween, said space being filled with grease.

47. An energy conversion method comprising:

providing a magnetic device including a casing, a solenoid disposed inside said casing, a stationary magnetic core disposed inside said solenoid, said stationary core being fixed relative to said solenoid and said casing, and a movable magnetic core disposed for reciprocation inside said solenoid along an axis;

reciprocating said movable magnetic core along said axis and between a maximally retracted position to a maximally extended position, said movable magnetic core having a maximum proportion of its length located inside said solenoid in said maximally retracted position and a minimum proportion of its length located inside said solenoid in said maximally extended position; and during reciprocating of said movable magnetic core, supplying to said solenoid an electrical potential in the form of a series of transient electrical pulses having a phase synchronized with a reciprocating stroke of said movable magnetic core.

48. The method defined in claim 47, further comprising applying a force to said movable magnetic core to return said movable magnetic core from said maximally retracted position to said maximally extended position.

49. The method defined in claim 48 wherein the applying of said force includes pushing said movable magnetic core with a push rod extending along said axis through said stationary magnetic core.

50. The method defined in claim 49 wherein said push rod, said stationary magnetic core and said movable magnetic core are all made of the same material.

51. The method defined in claim 49, further comprising restoring said push rod to a withdrawn position prior to a moving of said movable magnetic core along said axis from said maximally extended position to said maximally retracted position.

52. The method defined in claim 51 wherein the restoring of said push rod precedes the moving of said movable magnetic core along said axis from said maximally extended position to said maximally retracted position by at least approximately 0.5 ms.

53. The method defined in claim 49 wherein said push rod has a cylindrical outer surface coated with a nickel layer and an outer copper layer.

54. The method defined in claim 49 wherein said force is mechanically derived.

55. The method defined in claim 54 wherein said force is a spring derived force.

56. The method defined in claim 47 wherein said pulses have a sawtooth profile to maximize magnetization for a given average current value.

57. The method defined in claim 56 wherein said average current value is approximately one-half of a maximum current value of said pulses.

58. The method defined in claim 47 wherein said pulses have a width or duration which is pulse width modulated according to an instantaneous inductance of said device.

59. The method defined in claim 47 wherein an additional inductor with a variable inductance is provided in an electrical circuit including said solenoid, further comprising continually adjusting the inductance of said additional inductor during reciprocating of said movable magnetic core to stabilize a magnetization speed of said casing and concomitantly decreasing a growth rate of current passing through said solenoid.

60. The method defined in claim 47 wherein said stationary magnetic core and said movable magnetic core have polygonal cross-sections in planes oriented essentially perpendicularly to said axis.

61. The method defined in claim 47 wherein said casing is made of magnetic material and the supplying of said electrical potential includes generating said pulses in a power supply and conducting said pulses to said solenoid, further comprising periodically disconnecting said power supply from said solenoid during reciprocating of said movable magnetic core, thereby permitting energy recuperation in magnetic material of at least one of said casing, said stationary magnetic core and said movable magnetic core.

* * * * *